(12) United States Patent
Carmen, Jr. et al.

(10) Patent No.: US 7,839,109 B2
(45) Date of Patent: Nov. 23, 2010

(54) METHOD OF CONTROLLING A MOTORIZED WINDOW TREATMENT

(75) Inventors: Lawrence R. Carmen, Jr., Bath, PA (US); Thomas Warren Brenner, Wescosville, PA (US); Stephen Lundy, Coopersburg, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 383 days.

(21) Appl. No.: 12/098,088

(22) Filed: Apr. 4, 2008

(65) Prior Publication Data
US 2008/0260363 A1  Oct. 23, 2008

Related U.S. Application Data

(60) Provisional application No. 60/923,907, filed on Apr. 17, 2007.

(51) Int. Cl.
G05D 3/00 (2006.01)
(52) U.S. Cl. .................................. 318/466; 318/490
(58) Field of Classification Search .............. 318/466, 318/490
See application file for complete search history.

(56) References Cited

U.S. PATENT DOCUMENTS

| | | | |
|---|---|---|---|
| 4,873,453 A | 10/1989 | Schmerda et al. | |
| 5,467,266 A | 11/1995 | Jacobs et al. | |
| 6,069,428 A | 5/2000 | Nelson | |
| 6,100,659 A | 8/2000 | Will et al. | |
| 6,201,364 B1 | 3/2001 | Will et al. | |
| 6,392,374 B1 | 5/2002 | Menetrier et al. | |

(Continued)

FOREIGN PATENT DOCUMENTS

JP        05-25982 A       2/1993

(Continued)

OTHER PUBLICATIONS

European Patent Office, International Search Report and Written Opinion for International Patent Application No. PCT/US2008/060407, Jul. 31, 2008, 8 pages.

(Continued)

*Primary Examiner*—Walter Benson
*Assistant Examiner*—Erick Glass
(74) *Attorney, Agent, or Firm*—Mark E. Rose; Philip N. Smith

(57) ABSTRACT

A method of controlling a motorized window treatment provides for continued operation of the motorized window treatment during an overload or low-line condition. The motorized window treatment is driven by an electronic drive unit having a motor, a motor drive circuit, and a controller. The controller controls the motor drive circuit to drive the motor with a pulse-width modulated signal generated from a bus voltage. The controller is operable to monitor the magnitude of the bus voltage. If the bus voltage drops below a first voltage threshold, the controller stops the motor or reduces the duty cycle of the pulse-width modulated signal to allow the bus voltage to increase to an acceptable magnitude. When the bus voltage rises above a second voltage threshold, the controller begins driving the motor normally once again. During an overload or low-line condition, the controller is prevented from resetting, while driving the motor with minimal interruption to the movement of the motorized window treatment.

23 Claims, 18 Drawing Sheets

U.S. PATENT DOCUMENTS

| | | |
|---|---|---|
| 6,465,980 B1 | 10/2002 | Orsat |
| 6,497,267 B1 | 12/2002 | Azar et al. |
| 6,972,538 B2 | 12/2005 | Dupielet et al. |
| 6,983,783 B2 | 1/2006 | Carmen, Jr. et al. |
| 7,281,565 B2 | 10/2007 | Carmen, Jr. et al. |
| 2003/0030950 A1 | 2/2003 | Bruno |
| 2003/0205978 A1 | 11/2003 | Lee |
| 2004/0100216 A1 | 5/2004 | Makaran et al. |
| 2006/0232233 A1 | 10/2006 | Adams et al. |
| 2006/0232234 A1 | 10/2006 | Newman, Jr. |
| 2008/0258666 A1 | 10/2008 | Carmen et al. |

FOREIGN PATENT DOCUMENTS

| | | |
|---|---|---|
| JP | 2003 301679 A | 10/2003 |

OTHER PUBLICATIONS

European Patent Office, International Search Report and Written Opinion for International Patent Application No. PCT/US2008/060448, Aug. 19, 2008, 16 pages.

U.S. Appl. No. 11/787,723, filed Apr. 17, 2007, Carmen, Jr. et al.

| m | Position | Memory Counter |
|---|----------|----------------|
| | 2 bytes | 2 bytes |
| 1 | 8000 | 0041 |
| 2 | 8001 | 0042 |
| 3 | 8002 | 0043 |
| 4 | 8004 | 0044 |
| 5 | 8005 | 0045 |
| 6 | 8006 | 0046 |
| 7 | 8522 | 0027 |
| 8 | 8523 | 0028 |
| . . . . . | . . . . . | |

METHOD OF CONTROLLING A MOTORIZED WINDOW TREATMENT

RELATED APPLICATIONS

This application claims priority from commonly-assigned U.S. Provisional Application Ser. No. 60/923,907, filed Apr. 17, 2007, entitled METHOD OF CONTROLLING A MOTORIZED WINDOW TREATMENT, the entire disclosure of which is hereby incorporated by reference.

BACKGROUND OF THE INVENTION

1. Field of the Invention

The present invention relates to a method of controlling a motorized window treatment, and more specifically, a method of controlling a motorized roller shade during a motor overload or low-line condition.

2. Description of the Related Art

Motorized window treatments typically include a flexible fabric or other means for covering a window in order to block or limit the daylight entering a space and to provide privacy. The motorized window treatments may comprise, for example, roller shades, Roman shades, or draperies. The motorized window treatments include a motor drive for movement of the fabric in front of the window to control the amount of the window that is covered by the fabric. For example, a typical motorized roller shade includes a flexible shade fabric wound onto an elongated roller tube with an electronic drive unit installed in the roller tube. The electronic drive unit includes a motor, such as a direct-current (DC) motor, which is operable to rotate the roller tube upon being energized by a DC voltage.

In order to provide for advanced control of the roller shade, the electronic drive unit comprises a microprocessor or other processing means. The microprocessor is operable to control the rotational speed of the roller tube, to store a fully open position (i.e., an open shade limit) and a fully closed position (i.e., a closed shade limit), and to recall a preset position of the shade fabric. The microprocessor keeps track of the position of the shade fabric by counting the rotations of the motor shaft and determines when the shade fabric has moved to a desired position. The microprocessor receives power from a DC voltage supplied by an internal power supply in the electronic drive unit.

Motor overload conditions and low-line conditions may cause the DC voltage of the internal power supply of the electronic drive unit to drop below the voltage level required by the microprocessor to remain operational, and thus, may cause the microprocessor to reset. For example, the motor may suddenly draw a large amount of current if the electronic drive unit is driving the motor, but the shade fabric is unexpectedly prevented from moving. A transitory large current drawn from the power supply of the electronic drive unit may cause the DC voltage to drop below the regulated level and thus cause the microprocessor to reset. As used herein, an overload condition of a motor is defined as an event that causes the motor to suddenly draw a much larger amount of current. A motor may draw, for example, approximately 800 mA to 1.5 A during normal operation, and approximately 2 A to 10 A during an overload condition.

Further, if the voltage received by the internal power supply drops below the required input voltage of the power supply (i.e., the drop-out voltage), the DC voltage supplied by the internal power supply may drop below the regulated level.

If the microprocessor resets during movement of the roller shade, the position information maintained by the microprocessor may become inaccurate, which could also prevent the microprocessor from moving the shade fabric. Thus, there is a need for a method of controlling a motorized window treatment, in which the microprocessor is operable to control the motorized window treatment without resetting in the occurrence of an overload condition or a low-line condition.

SUMMARY OF THE INVENTION

A method of controlling a motorized window treatment in response to a command during an overload condition is described herein. The motorized window treatment comprises a motor, which is selectively driven by a bus voltage. The method comprising the steps of: (1) driving the motor in response to the command; (2) monitoring the magnitude of the bus voltage; (3) comparing the magnitude of the bus voltage to a first voltage threshold; (4) decreasing the amount of current supplied to the motor if the magnitude of the bus voltage has dropped below the first voltage threshold; (5) comparing the magnitude of the bus voltage to a second voltage threshold after the step of decreasing the amount of current supplied to the motor; and (6) increasing the amount of current supplied to the motor in response to the command if the magnitude of the bus voltage has risen above the second voltage threshold.

According to a first embodiment of the present invention, the steps of increasing and decreasing the amount of current supplied to the motor respectively comprise stopping driving the motor if the bus voltage has dropped below the first voltage threshold, and driving the motor once again in response to the command if the bus voltage has risen above the second voltage threshold.

According to second embodiment of the present invention, the method further comprises the step of generating a pulse-width modulated signal characterized by a duty cycle from the bus voltage. Further, the steps of increasing and decreasing the amount of current supplied to the motor respectively comprise reducing the duty cycle of the pulse-width modulated signal driving the motor if the bus voltage has dropped below the first voltage threshold, and increasing the duty cycle of the pulse-width modulated signal driving the motor if the bus voltage has risen above the second voltage threshold.

An electronic drive unit for controlling the position of a motorized window treatment during an overload condition is also described herein. The electronic drive unit comprises a motor coupled to the motorized window treatment for adjusting the position of the motorized window treatment, a motor drive circuit coupled to the motor for driving the motor from a bus voltage, and a controller coupled to the motor drive circuit operable to drive the motor drive circuit so as to control the rotation of the motor to control the motorized window treatment in response to a command. The electronic drive unit further comprises a bus voltage monitor circuit coupled to the controller for providing a control signal representative of a magnitude of the bus voltage to the controller, such that the controller is operable to compare the magnitude of the bus voltage to a first voltage threshold, to control the motor drive circuit to decrease the amount of current supplied to the motor if the bus voltage has dropped below the first voltage threshold, to subsequently compare the magnitude of the bus voltage to a second voltage threshold, and to control the motor drive circuit to increase the amount of current supplied to the motor if the bus voltage has risen above the second voltage threshold.

According to another embodiment of the present invention, a system for delivering a transitory duration of high power from a power source to an electrical load without collapsing a supply voltage comprises first and second power supplies, a drive circuit, and a controller. The first power supply generates a bus voltage from a source voltage of the power source, while the second power supply generates the supply voltage from the bus voltage. The drive circuit receives the bus voltage and is adapted to control the amount of current delivered to the electrical load. The controller is powered by the supply voltage, is coupled to the drive circuit for controlling the amount of current delivered to the electrical load, and is responsive to the magnitude of the bus voltage. The controller is operable to compare the magnitude of the bus voltage to a first voltage threshold, to control the drive circuit to decrease the amount of current supplied to the electrical load if the bus voltage has dropped below the first voltage threshold, to subsequently compare the magnitude of the bus voltage to a second voltage threshold, and to control the drive circuit to increase the amount of current supplied to the electrical load if the bus voltage has risen above the second voltage threshold.

Other features and advantages of the present invention will become apparent from the following description of the invention that refers to the accompanying drawings.

DETAILED DESCRIPTION OF THE INVENTION

Figure 1:
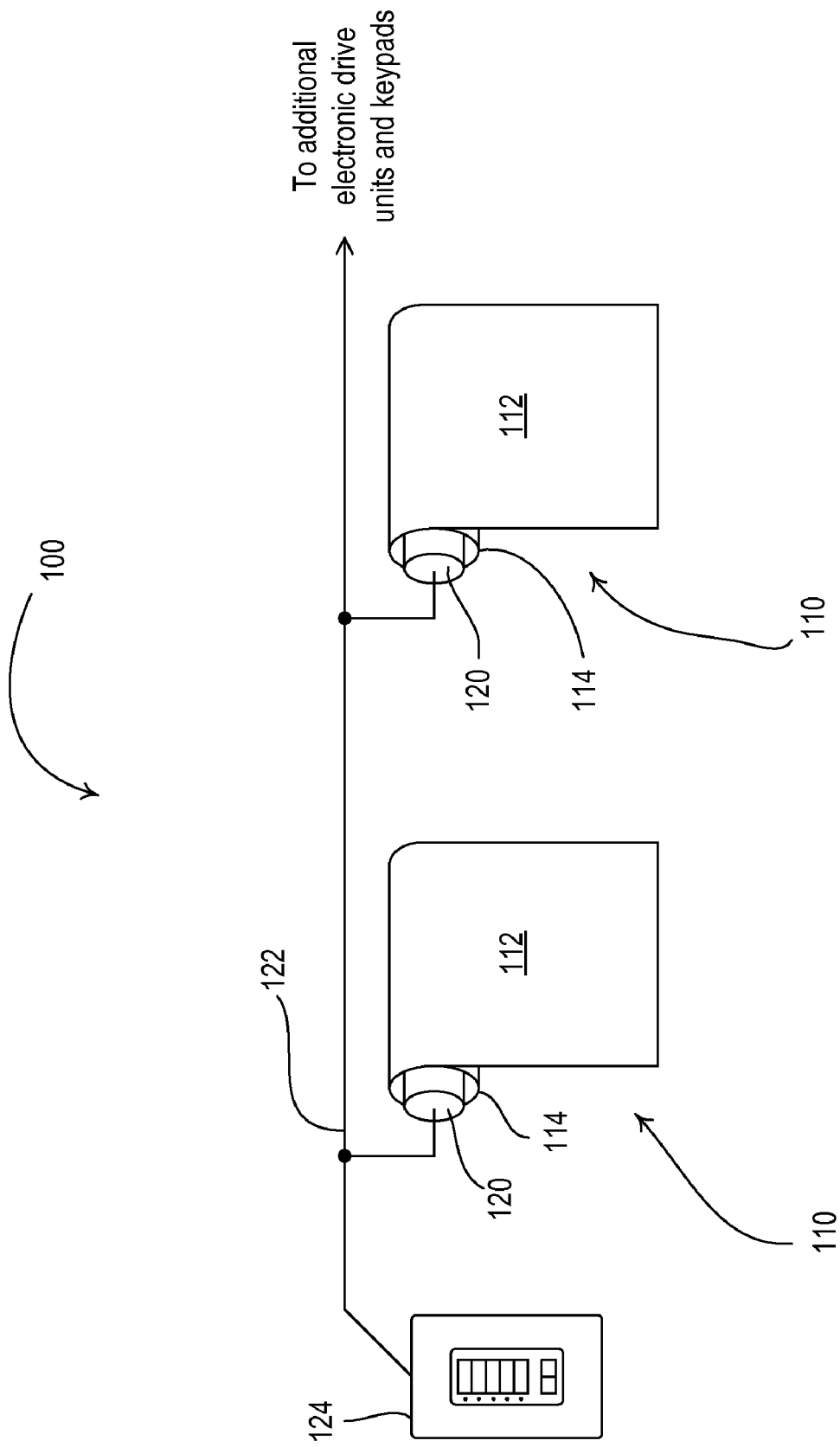
FIG. 1 is a simplified block diagram of the motorized window treatment control system comprising a plurality of motorized window shades.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of the motorized window treatment control system 100 according to a first embodiment of the present invention. The motorized window treatment control system 100 comprises a plurality of motorized window shades 110, which each comprise a flexible shade fabric 112 rotatably supported by a roller tube 114. The motorized window treatments 110 are controlled by electronic drive units (EDUs) 120, which may be located inside the roller tubes 114. The electronic drive units 120 are operable to control the shade fabrics 112 between an open position and a closed position. The EDUs 120 are coupled to a communication link 122 and are operable to receive commands across the communication link from a keypad 124. The communication link 122 may comprise a wired communication link or a wireless communication link, such as, for example, a radio-frequency (RF) communication link or an infrared (IR) communication link. The control system 100 is described in greater detail in commonly-assigned U.S. Pat. No. 6,983,783, issued Jan. 10, 2006, entitled MOTORIZED SHADE CONTROL SYSTEM, the entire disclosure of which is hereby incorporated by reference.

Figure 2:
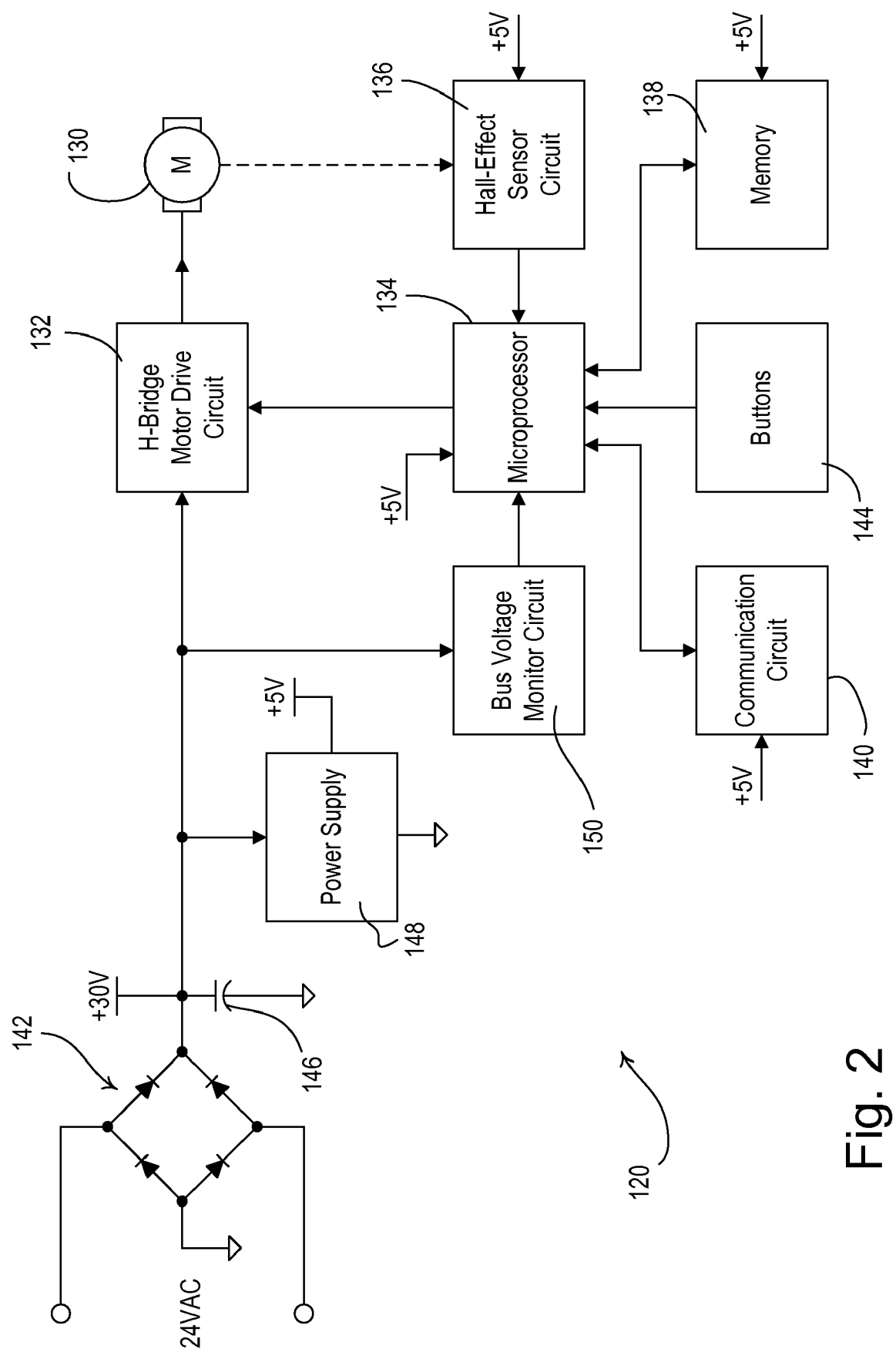
FIG. 2 is a simplified block diagram of the electronic drive unit of one of the motorized window shades of FIG. 1.

FIG. 2 is a simplified block diagram of the electronic drive unit 120 of the motorized window shade 110 according to the first embodiment of the present invention. A DC motor 130 is coupled to the roller tube 114 and is operable to controllably rotate the roller tube at a constant speed when a constant DC voltage or a pulse-width modulated (PWM) signal having a constant duty cycle is applied to the motor. Changing the magnitude of the DC voltage or the duty cycle of the PWM signal applied to the DC motor 130 will change the rotational speed of the motor. Further, the DC motor 130 is operable to change the direction of rotation in response to a change in the polarity of the DC voltage or PWM signal applied to the DC motor.

To accomplish this level of control of the DC motor 130, the motor is coupled to an H-bridge motor drive circuit 132, which is driven by a microcontroller 134. The H-bridge motor drive circuit 132 comprises four transistors, such as, for example, four field effect transistors (not shown). The transistors are coupled such that, when two of the transistors are conductive, a positive DC voltage is applied to the DC motor 130 to cause the DC motor to rotate in a forward direction. When the other two transistors of the H-bridge circuit 132 are conductive, a negative DC voltage is applied to the DC motor 130 to cause the motor to rotate in the reverse direction. To control the speed of the DC motor 130, the microcontroller 134 drives at least one of the transistors of the H-bridge circuit 132 with a PWM signal. The microcontroller 134 may be any suitable controller, such as a programmable logic device (PLD), a microprocessor, an application specific integrated circuit (ASIC), or a field-programmable gate array (FPGA).

The electronic drive unit 120 includes a rotational position sensor, such as, for example, a Hall effect sensor (HES) circuit 136, which is operable to provide information regarding the rotational speed and direction of the DC motor 130 to the microcontroller 134. The rotational position sensor may also comprise other suitable position sensors, such as, for example, optical and resistive sensors. The Hall effect sensor circuit 136 will be described in greater detail below with reference to FIGS. 3 and 4. The microcontroller 134 is operable to determine a rotational position of the motor 130 in response to the Hall effect sensor circuit 136. The microcontroller 134 uses the rotational position of the motor 130 to determine a present position of the shade fabric 112. The microcontroller 134 is coupled to a non-volatile memory 138 for storage of the present position of the shade fabric 112, the fully open position, and the fully closed position. The memory 138 may comprise an electrically erasable programmable read-only memory (EEPROM).

The electronic drive unit 120 comprises a communication circuit 140 that allows the microcontroller 134 to transmit and receive communication signals to and from the keypad 124 and other electronic drive units 120. The electronic drive unit 120 further comprises a plurality of buttons 144 that allow a user to provide inputs to the microcontroller 134 during setup and configuration of the motorized window shade 110. For example, the buttons 144 comprise a clockwise button and a counterclockwise button. The microcontroller 134 drives the motor 130 in a clockwise direction at a constant rotational speed while the clockwise button is pressed and held, and drives the motor in a counterclockwise direction at a constant rotational speed while the counterclockwise button is pressed.

The microcontroller 134 is operable to control the movement of the shade fabric 112 in response to a shade movement command, e.g., from the communication signals received via the communication circuit 140 or the user inputs from the buttons 144. The shade movement command may consist of a command type (e.g., "move to a desired position" or "move at a constant rotational speed") and a desired position (to which the microcontroller 134 is operable to control the shade fabric 112). The desired position may be the preset position, the fully open position, or the fully closed position.

The electronic drive unit 120 receives power from a 24-$V_{AC}$ source voltage generated by an alternating-current power source (not shown). The 24-$V_{AC}$ source voltage is provided to a full-wave bridge rectifier 142 for generating a bus voltage $V_{BUS}$, which is filtered by a storage capacitor 146 and has, for example, a nominal magnitude of approximately 30 $V_{DC}$. The bus voltage $V_{BUS}$ is provided to the H-bridge motor drive circuit 132 for driving the motor 130. A power supply 148 receives the bus voltage $V_{BUS}$ and generates a 5-$V_{DC}$ supply voltage $V_{CC}$ for powering the low-voltage circuitry of the electronic drive unit 120 (i.e., the microcontroller 134, the memory 138, and the communication circuit 140). The electronic drive unit 120 further comprises a bus voltage monitor circuit 150, which provides a control signal representative of the magnitude of the bus voltage $V_{BUS}$ to the microcontroller 134.

Figure 3A:
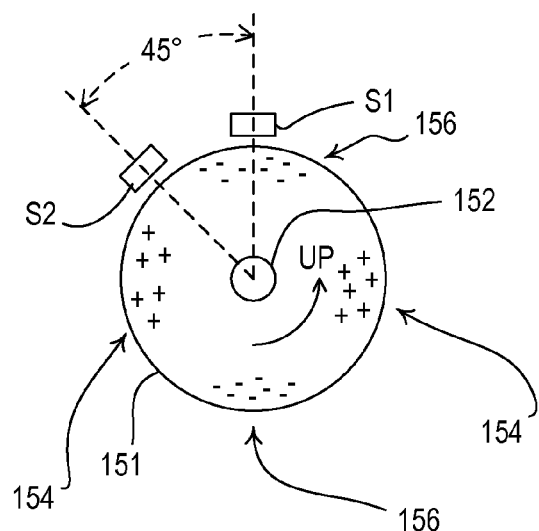
FIG. 3A is a partial schematic end view of the electronic drive unit of FIG. 2 showing the physical assembly of a Hall effect sensor circuit.

FIG. 3A is a partial schematic end view of the electronic drive unit 120 showing the physical assembly of the Hall effect sensor circuit 136. The Hall effect sensor circuit 136 comprises two Hall effect sensors S1, S2. The sensors S1, S2 are located in close proximity with a sensor magnet 151, which is secured to an output shaft 152 of the motor 130. The sensors S1, S2 are located adjacent the periphery of the magnet 151 and separated from each other by 45°. The sensor magnet 150 includes two positive poles 154 (i.e., "north" poles) and two negative poles 156 (i.e., "south" poles). Alternatively, the sensor magnet 151 may only include one positive pole and one negative pole.

Figure 3B:
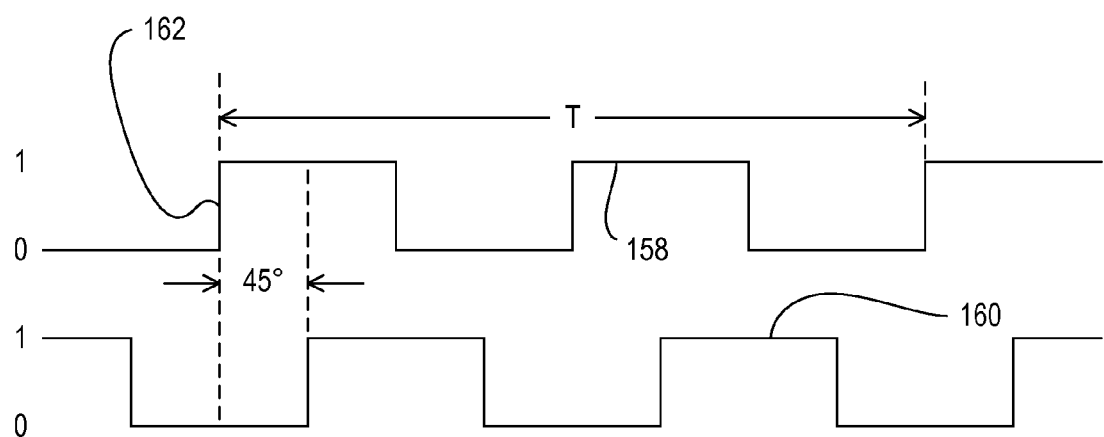
FIG. 3B is a diagram of a first output signal and a second output signal of the Hall effect sensor circuit of FIG. 3A.

FIG. 3B is a diagram of a first output signal 158 and a second output signal 160 of the sensors S1, S2, respectively. The sensors S1, S2 provide the output signals 158, 160 to the microcontroller 134 as a train of pulses in dependence upon whether each of the sensors are close to one of the positive poles 154 or one of the negative poles 156. For example, when the sensor magnet 151 rotates such that one of the north poles 154 moves near the first sensor S1 (rather than one of the adjacent negative poles 156), the first output signal 158 transitions from low (i.e., a logic zero) to high (i.e., a logic one) as shown by a Hall effect sensor edge 162 in FIG. 3B. Hall effect sensor edges may be either low-to-high transitions or high-to-low transitions of the first and second output signals 158, 160. When the sensor magnet 151 has two positive poles and two negative poles, the output signals 158, 160 have two rising edges and two falling edges per revolution of the output shaft 152.

The frequency, and thus the period T, of the pulses of the output signals 158, 160 is a function of the rotational speed of the motor output shaft 152. The relative spacing between the pulses of the first and second output signals 158, 160 is a function of rotational direction. When the motor 130 is rotating in a counterclockwise direction of the motor output shaft 152 (marked "UP" in FIG. 3A), the second output signal 160 lags behind the first output signal 158 by approximately 45° or ⅛ of the period T. When the motor 130 is rotating in the opposite direction, the second output signal 160 leads the first output signal 158 by approximately 45°. The operation of the H-bridge motor drive circuit 132 and the Hall effect sensor circuit 136 of the electronic drive unit 120 is described in greater detail in commonly-assigned U.S. Pat. No. 5,848,634, issued Dec. 15, 1998, entitled MOTORIZED WINDOW SHADE SYSTEM, and commonly-assigned U.S. Pat. No. 6,497,267, issued Dec. 24, 2002, entitled MOTORIZED WINDOW SHADE WITH ULTRAQUIET MOTOR DRIVE AND ESD PROTECTION. The entire disclosures of both patents are herein incorporated by reference.

The microcontroller 134 stores the present position of the shade fabric 112 in the memory 138 as a number of Hall effect sensors edges between the present position of the shade fabric and the open position. The microcontroller 134 also stores the fully open position and the fully closed position in the memory 138 in terms of Hall effect sensor edges. During the setup and configuration of the electronic drive unit 120, the fully open position and the fully closed position are set and stored in the memory 138.

The microcontroller 134 is operable to store the present position of the shade fabric 112 in the memory 138 each time the microcontroller 134 receives a Hall effect sensor edge of, e.g., the first output signal 158 of FIG. 3B. For example, the microcontroller 134 stores the present position at least once every eight (8) Hall effect sensor edges, i.e., every two rotations of the motor 130. Further, when the microcontroller 134 receives the shade movement command, the microcontroller 134 is operable to store the command (e.g., including the command type and the desired final position of the shade fabric 112 after the command is executed) in the memory 138.

The bus voltage $V_{BUS}$ (provided by the rectifier 142) and the supply voltage $V_{CC}$ (generated by the power supply 148) may decrease in response to a motor overload condition or a low-line condition. For example, if the motor 130 is overloaded, the current drawn by the motor may suddenly increase. This large current may be larger than the magnitude of the current provided to the storage capacitor 146 through the rectifier 142, and thus the voltage across the storage capacitor may decrease. Further, the AC power source supplying power to the electronic drive unit 120 may be current limited, such that the voltage supplied by the AC power source may decrease in response to the large current drawn by the motor 130 during the overload condition. Accordingly, the supply voltage $V_{CC}$ generated by the power supply 148 may decrease below the voltage level required by the microcontroller 134 to remain operational during the overload condition, thus causing the microcontroller 134 to reset.

Figures 4A, 4C:
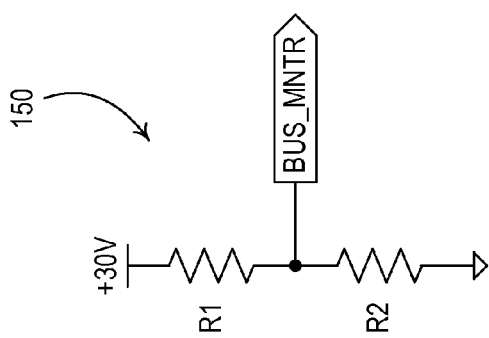
FIG. 4A is a simplified schematic diagram of a first embodiment of a bus voltage monitor circuit of the electronic drive unit of FIG. 2.
FIG. 4C is a simplified diagram of a position table used by a microcontroller of the electronic drive unit of FIG. 2.

FIG. 4A is a simplified schematic diagram of the first embodiment of the bus voltage monitor circuit 150 according to the first embodiment of the present invention. The bus voltage monitor circuit 150 simply comprises a resistor divider having two resistors R1, R2 coupled in series between the bus voltage $V_{BUS}$ and circuit common. For example, the resistors R1, R2 have resistances of approximately 44 kΩ and 5.6 kΩ, respectively. A control signal BUS_MNTR (which is simply a scaled version of the bus voltage $V_{BUS}$) is produced at the junction of the resistors R1, R2 and is provided to a port of the microcontroller 134. The microcontroller 134 comprises an analog-to-digital converter (ADC), such that the microcontroller 134 is operable to sample the value of the control signal BUS_MNTR and to control the motor 130 in response.

The microcontroller 134 is operable to monitor the magnitude of the bus voltage $V_{BUS}$ via the bus voltage monitor circuit 150 and to decrease the amount of current delivered to the motor 130 to allow the storage capacitor 146 to recharge. Specifically, the microcontroller 134 samples the control signal BUS_MNTR provided by the bus voltage monitor circuit 150 (which is representative of the magnitude of the bus voltage $V_{BUS}$) and compares the magnitude of the bus voltage $V_{BUS}$ to a first voltage threshold $V_{TH1}$. If the magnitude of the bus voltage $V_{BUS}$ drops below the first voltage threshold $V_{TH1}$, the microcontroller 134 decreases the amount of current delivered to the motor 130, for example, by stopping the motor. The first voltage threshold $V_{TH1}$ may be, for example, approximately 18 V, which corresponds to a magnitude of the control signal BUS_MTNR of approximately 2 V. The first voltage threshold $V_{TH1}$ is determined such that the power supply 148 is able to continue generating the supply voltage $V_{CC}$ to power the microcontroller 134 without interruption.

Alternatively, the microcontroller 134 may scale back driving the motor rather than simply stopping the motor 130 if the bus voltage $V_{BUS}$ drops below the first voltage threshold $V_{TH1}$. For example, the microcontroller 134 may decrease the duty cycle of the PWM signal provided to the motor drive circuit 132 to decrease the drive to the motor 130.

When the magnitude of the bus voltage $V_{BUS}$ rises above a second voltage threshold $V_{TH2}$ larger than the first voltage threshold $V_{TH1}$, the microcontroller 134 is operable to increase the amount of current delivered to the motor 130, for example, by once again driving the motor. The second voltage threshold $V_{TH2}$ may be, for example, approximately 24 V (i.e., resulting in a magnitude of the control signal BUS_MNTR of approximately 2.64 V). Therefore, during an overload condition or a low-line condition, the microcontroller 134 is operable to drive the motor 130 with minimal interruption to movement of the shade fabric 112, while allowing the power supply 148 to maintain the supply voltage $V_{CC}$ above the voltage level required by the microcontroller to remain operational. Accordingly, resetting of the microcontroller 134 during the overload or low-line condition is avoided.

Figure 4B:
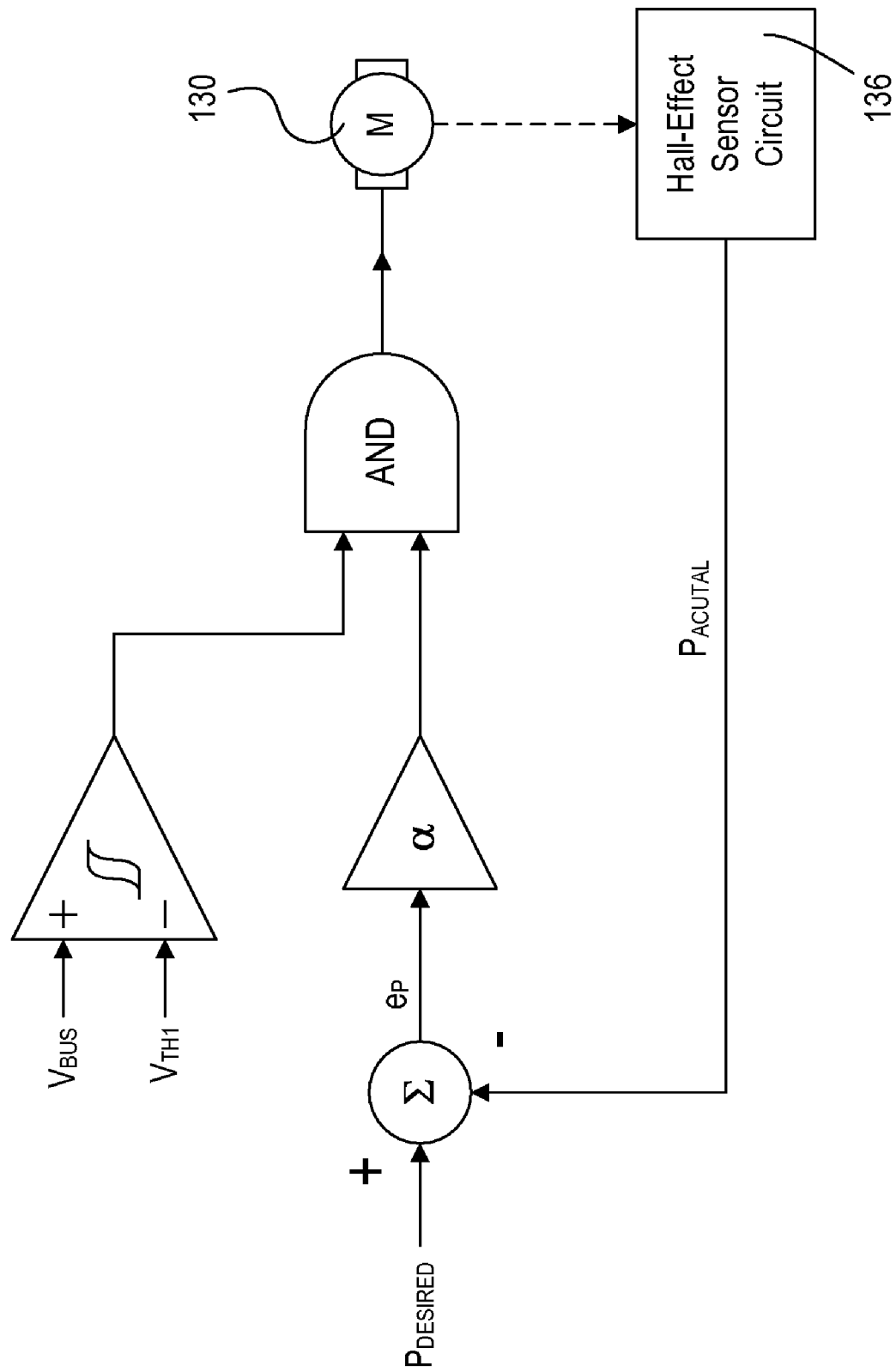
FIG. 4B is a simplified diagram of a control loop of the electronic drive unit of FIG. 2.

FIG. 4B is a simplified diagram of a control loop of the EDU 120, which is primarily executed by the microcontroller 134, according to the first embodiment of the present invention. The microcontroller 134 controls the speed of the motor 130 in response to an instantaneous desired shade position $P_{DESIRED}$ (which is specified in terms of Hall effect sensor edges). The Hall effect sensor circuit 136 generates the first and second output signals 158, 160, which are representative of an actual shade position $P_{ACTUAL}$. The actual shade position $P_{ACTUAL}$ is subtracted from the desired shade position $P_{DESIRED}$ to produce an error signal ep, which is applied to a gain α. The bus voltage $V_{BUS}$ is compared to the first threshold $V_{TH1}$ using some hysteresis (i.e., the second threshold $V_{TH2}$). When the bus voltage $V_{BUS}$ is greater than the first threshold $V_{TH1}$, the speed of the motor 130 is controlled in response to the difference of the desired shade position $P_{DESIRED}$ and the actual shade position $P_{ACTUAL}$. However, when the bus voltage $V_{BUS}$ is less than the first threshold $V_{TH1}$, the speed of the motor 130 is controlled to zero (i.e., off).

If the microcontroller 134 does reset during movement of the shade fabric 112, the microcontroller is operable to immediately recall the present position of the shade fabric 112 and the present command (i.e., the command type and the desired position) from the memory 138. The microcontroller 134 then continues moving the shade fabric 112 to the final destination with little delay or loss of positional accuracy. Sometimes, the microcontroller 134 may repeatedly reset while the shade fabric 112 is moving. The microcontroller 134 uses a reset counter to keep track of the number of the times that the microcontroller sequentially resets prior to reaching the desired position. The microcontroller 134 only retries to move the shade fabric 112 (i.e., only consecutively resets) a predetermined number of times, e.g., approximately 25 times, before ceasing to drive the motor 130, although the predetermined number of time may comprise a number larger or smaller than 25.

The microcontroller 134 is further operable to determine if the motor 130 is operating in a stall condition, rather than an overload condition. A stall occurs when the microcontroller 134 attempts to drive the motor 130, however the motor 130 does not rotate or rotates less than a predetermined amount, e.g., only one rotation of the motor. During an overload condition, the motor 130 typically rotates more than one rotation of the motor. In response to repeatedly detecting a stall of the motor 130, the microcontroller 134 increments the reset counter at a faster rate, such that the microcontroller only tries to rotate the motor approximately five (5) times in the event of a stall.

If the shade movement command originates from the buttons 144 of the electronic drive unit 120 and the microcontroller 134 resets while the shade fabric 112 is moving, the microcontroller 134 does not attempt to drive the motor 130 upon resetting. Typically, the buttons 144 are accessed by a user while the electronic drive unit is being installed. Since the buttons 144 are physically located on the electronic drive unit 120, which is installed in the roller tube 114, the user typically must climb a ladder to access the buttons. As a safety feature, the method of the present application (i.e., to drive the motor 130 after resetting) is disabled when the shade movement command originates from the buttons 144 of the electronic drive unit 120.

As previously mentioned, the microcontroller 134 is operable to store the present position of the shade fabric 112 in the memory 138 at each Hall effect sensor edge. For example, the microcontroller 134 may store the position values sequentially in a position table 190 in the memory 138 (shown in FIG. 4C). Each memory location of the memory 138 comprises, for example, four bytes. The position values stored in the memory locations of the memory 138 each comprise, for example, two bytes. Each time the present position is stored in the memory 138, the microcontroller 134 increments a two-byte memory counter. When saving a position value to a memory location, the microcontroller 134 stores the memory counter in the additional two bytes of the memory location. The memory locations that the sequential positions are stored in are also sequential. The plurality of position values in the memory 138 provide a record of the movement of the shade fabric 112.

Figure 5A:
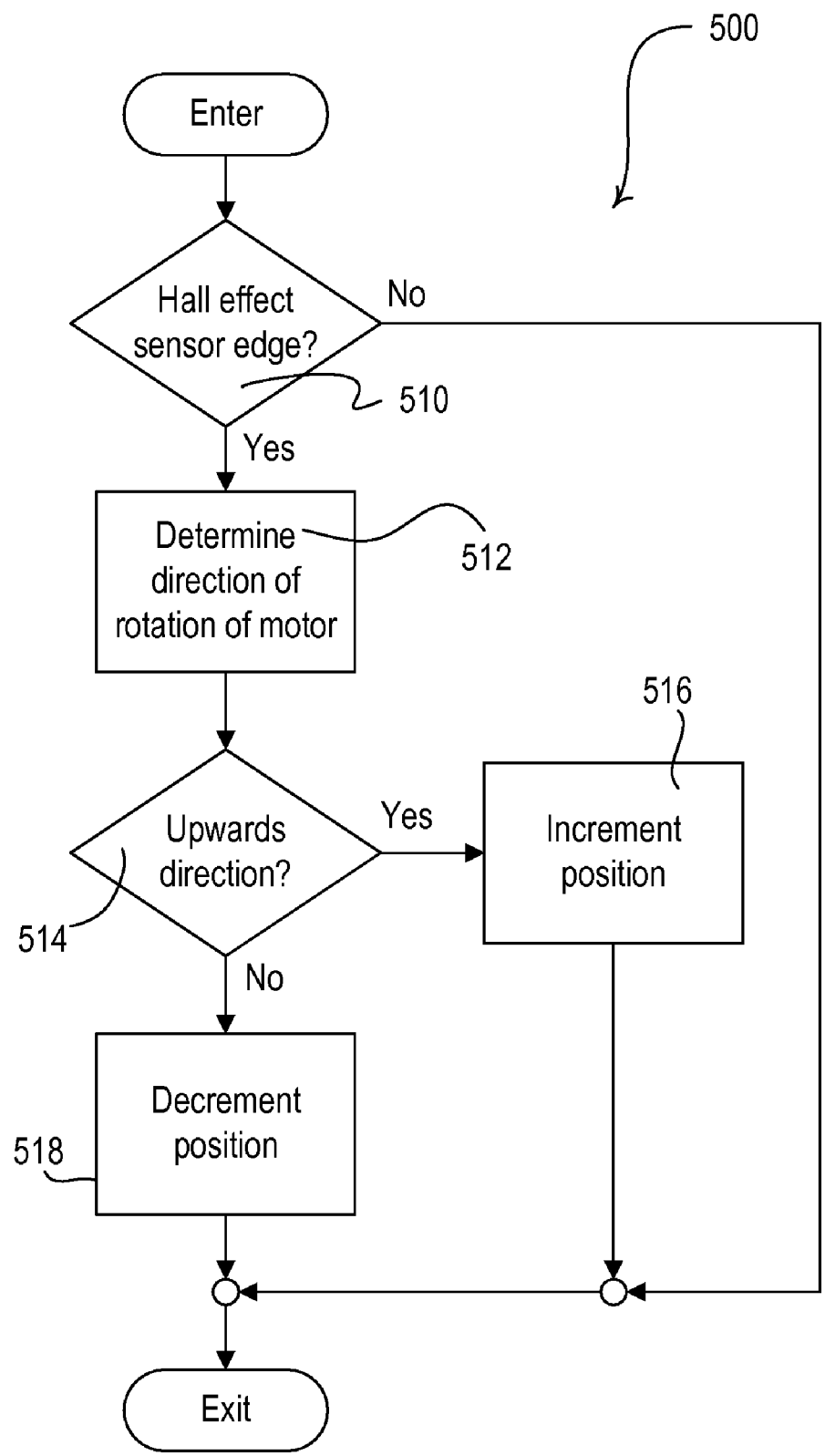
FIG. 5A is a simplified flowchart of a Hall effect sensor edge procedure executed by the microcontroller of the electronic drive unit of FIG. 2.

FIG. 5A is a simplified flowchart of a Hall effect sensor edge procedure 500 executed periodically by the microcontroller 134, e.g., every 572 μsec. If the microcontroller 134 has received a Hall effect sensor edge from the Hall effect sensor circuit 136 at step 510, the microcontroller 134 determines the direction of rotation of the motor 130 by comparing the consecutive edges of the first and second output signals 158, 160 at step 512. For example, if the second output signal 160 is lagging behind the first output signal 158 by approximately 45°, the motor 130 is rotating the roller tube such that the shade fabric 112 is moving in an upwards direction (as shown in FIG. 3A).

If the motor 130 is rotating in the upwards direction at step 514, the microcontroller 134 increments the present position (i.e., in terms of Hall effect sensor edges) by one at step 516. If the motor 130 is rotating in the downwards direction at step 514, the microcontroller 134 decrements the present position by one at step 518. After the present position is incremented or decremented at steps 516 and 518 respectively, the procedure 500 exits. If the microcontroller 134 has not received a Hall effect sensor edge at step 510, the procedure 500 simply exits.

Figure 5B:
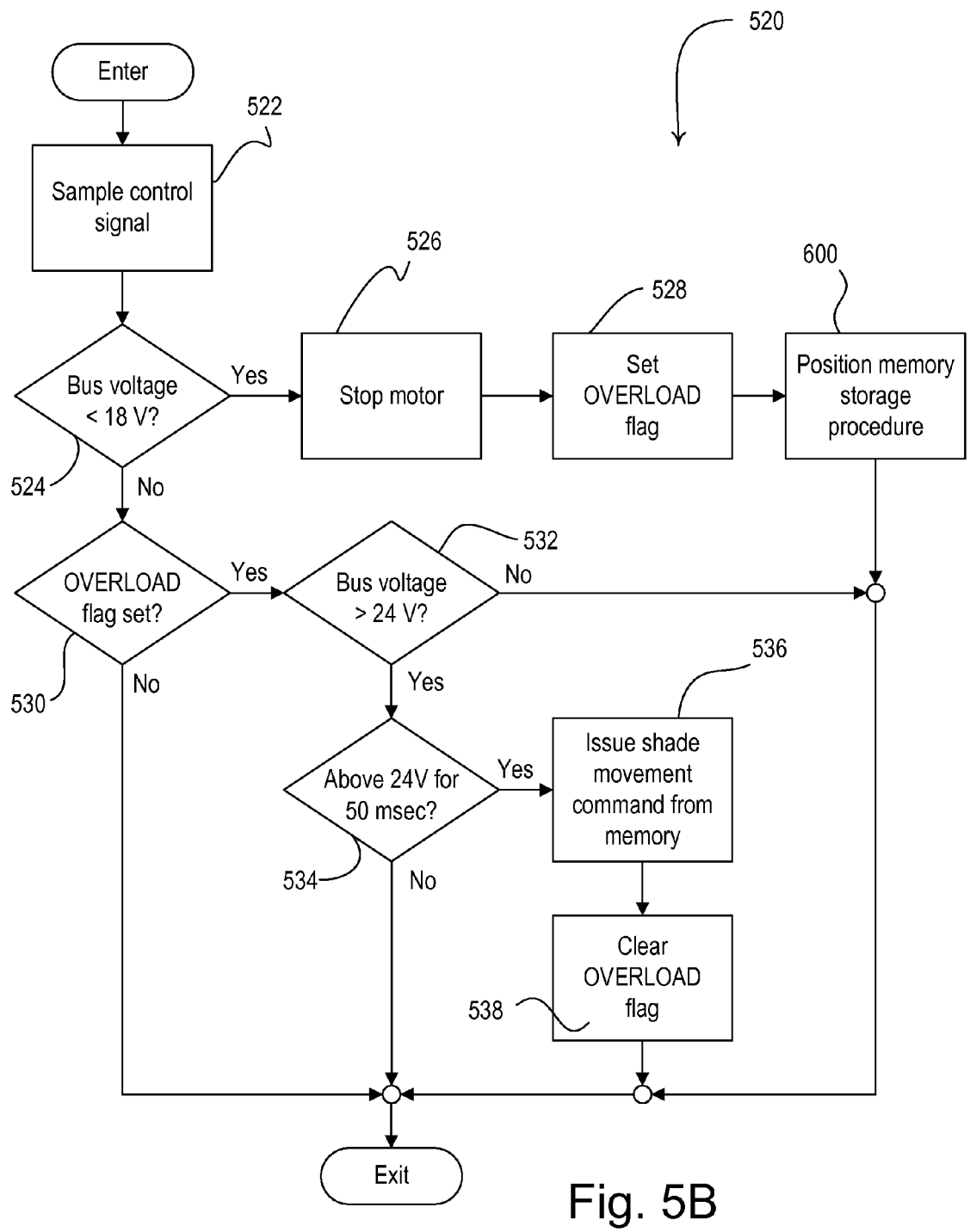
FIG. 5B is a simplified flowchart of a bus voltage monitor procedure executed by the microcontroller of the electronic drive unit of FIG. 2 according to a first embodiment of the present invention.

FIG. 5B is a simplified flowchart of a bus voltage monitor procedure 520 according to the first embodiment of the present invention. The bus voltage monitor procedure 520 is executed periodically by the microcontroller 134, e.g., every 572 μsec. The microcontroller 134 uses an OVERLOAD flag in the bus voltage monitor procedure 520. If the OVERLOAD flag is set during normal operation of the electronic drive unit 120, the microcontroller 134 does not drive the motor 130.

The microcontroller 134 first samples the control signal BUS_MNTR (which is representative of the bus voltage $V_{BUS}$) at step 522. If the bus voltage $V_{BUS}$ is less than the first voltage threshold $V_{TH1}$ (i.e., approximately 18 V) at step 524 (i.e., the sampled value of the control signal BUS_MNTR is less than approximately 2 V), the controller 134 stops the motor 130 at step 526 and sets the OVERLOAD flag to prevent the motor from being driven at step 528. Accordingly, the motor 130 is stopped to reduce the current drawn by the motor and to allow the storage capacitor 146 to charge. Next, the microcontroller 134 stores the present position of the shade fabric 112 in the memory 138 using a position memory storage procedure 600, which will be described in greater detail below with reference to FIG. 6. The procedure 520 then exits.

If the bus voltage $V_{BUS}$ is not less 18 V at step 524 and the OVERLOAD flag is set at step 530, a determination is made at step 532 as to whether the bus voltage $V_{BUS}$ has risen above the second voltage threshold $V_{TH2}$ (i.e., approximately 24 V). If the bus voltage $V_{BUS}$ is not greater than approximately 24 V at step 532, the procedure 520 simply exits.

However, if the bus voltage $V_{BUS}$ is greater than approximately 24 V at step 532, a determination is made at step 534 as to whether the bus voltage $V_{BUS}$ has been above 24 V for at least a predetermined amount of time, e.g., approximately 50 msec. If so, the microcontroller 130 issues a shade movement command based on the present command stored in the memory 138 at step 536 and clears the OVERLOAD flag at step 538 to allow the rotation of the motor 130. If the bus voltage $V_{BUS}$ has not been above 24 V for at least 50 msec at step 534, the procedure 520 exits. The determination at step 534 provides some hysteresis for the bus voltage monitor procedure 520. If the bus voltage $V_{BUS}$ is greater or equal to 18 V at step 524 and the OVERLOAD flag is not set at step 530, the bus voltage $V_{BUS}$ is at a normal level. Accordingly, the procedure 520 simply exits.

Figure 6:
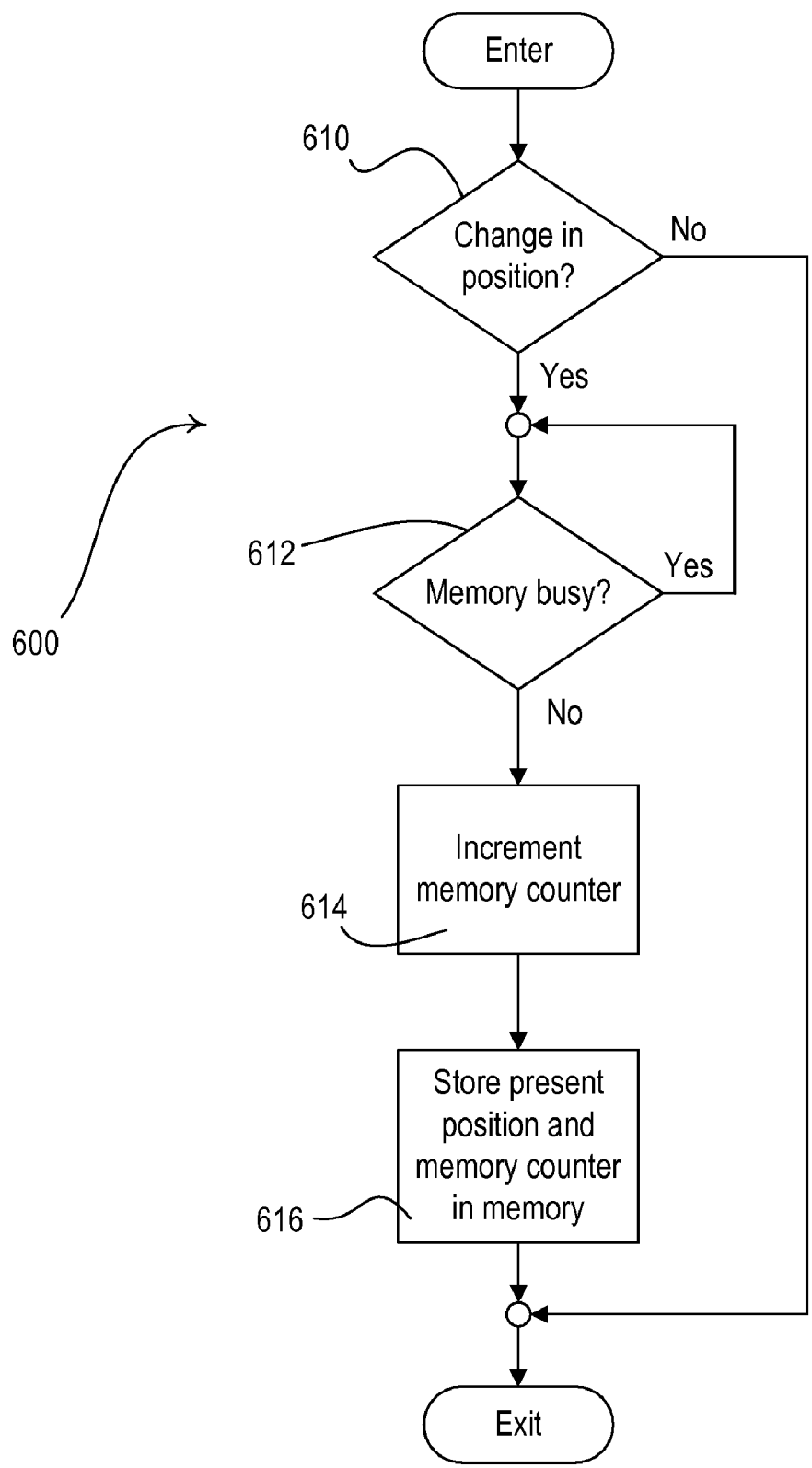
FIG. 6 is a simplified flowchart of a position memory storage procedure executed by the microcontroller of the electronic drive unit of FIG. 2.

FIG. 6 is a simplified flowchart of the position memory storage procedure 600. The position memory storage procedure 600 is executed periodically by the microcontroller 134, e.g., every four (4) msec. Also, the position memory storage procedure 600 is called by the bus voltage monitor procedure 520 if the control signal BUS_MNTR has dropped below the first voltage threshold $V_{TH1}$.

Referring to FIG. 6, if the microcontroller 134 determines that the present position has recently changed (e.g., has been incremented or decremented by the Hall effect sensor edge procedure 500) at step 610, a determination is made at step 612 as to whether the memory 138 is presently busy writing or reading data. If not, the microcontroller 134 increments the memory counter at step 614 and stores the present two-byte position and the two-byte memory counter value in the next memory location of the memory 138 at step 616, before the procedure 600 exits. If the present position has not recently changed at step 610 or if the memory 138 is busy at step 612, the procedure 600 simply exits. Accordingly, the position memory storage procedure 600 stores the present position of the shade fabric 112 each time the microcontroller 134 receives a Hall effect sensor edge unless the memory 138 is busy.

Figure 7A:
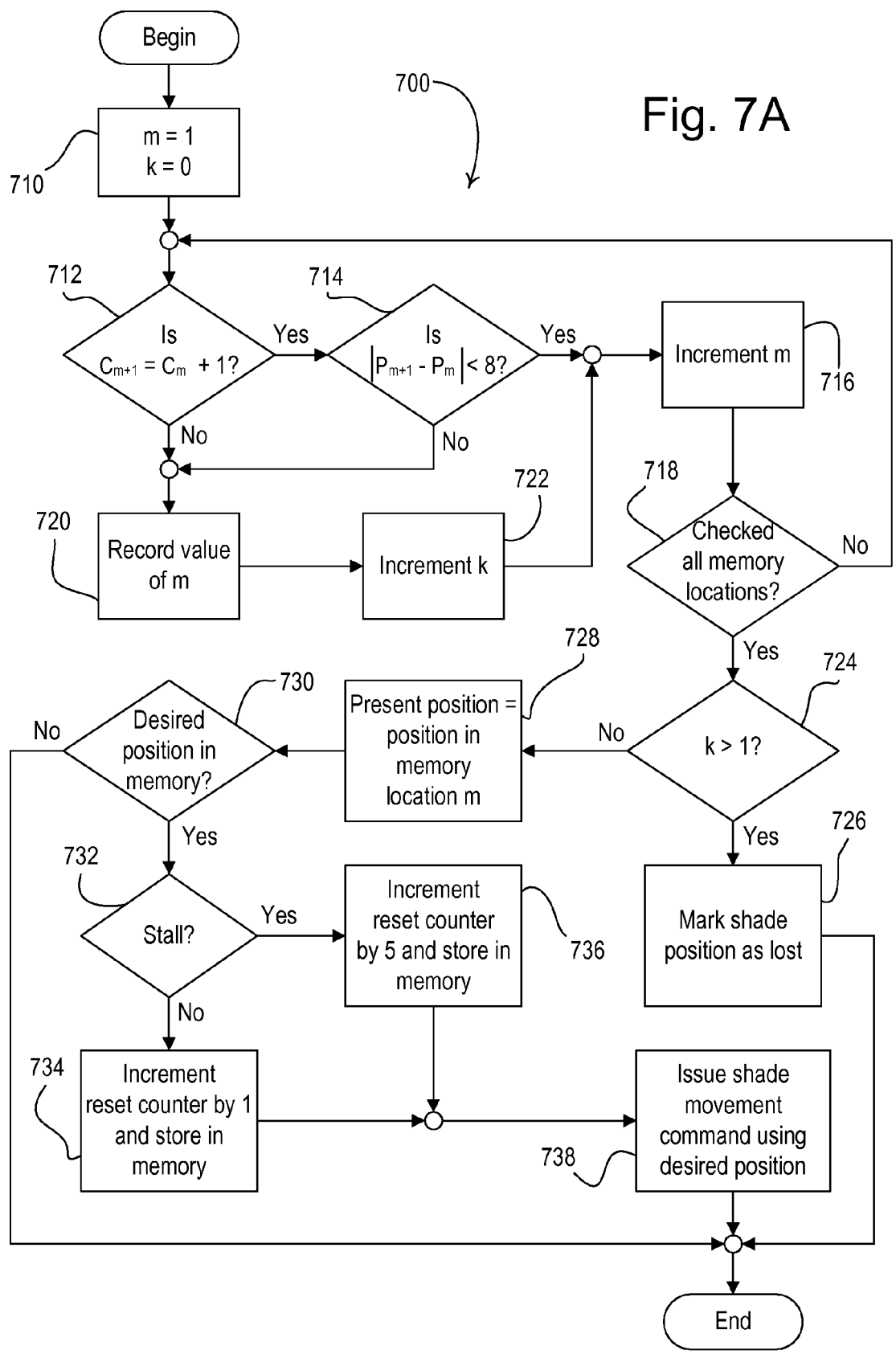
FIG. 7A is a simplified flowchart of a startup procedure executed by the microcontroller of the electronic drive unit of FIG. 2 whenever the microcontroller is powered up.

FIG. 7A is a simplified flowchart of a startup procedure 700 executed by the microcontroller 134 whenever the microcontroller is powered up, for example, if the microcontroller resets. The startup procedure 700 first examines the position table 190 stored in the memory 138 to determine the present position of the shade fabric 112. The microcontroller 134 searches for the location in the position table 190 where the sequential entries end, e.g., between memory locations six (6) and seven (7) as shown in FIG. 4C. The startup procedure 700 uses a variable m to keep track of the memory locations that are presently being examined and a variable k to count the number of discontinuities discovered in the position table 190. If more than one discontinuity is discovered, the data of the position table 190 is considered corrupt and the position of the shade fabric 112 is noted as lost.

At step 710, the variable m is set to one and the variable k is set to zero. Next, the microcontroller 134 determines if the memory counter values are sequential in the position table 190 at step 712 by determining if the memory counter value in the next memory location (i.e., $C_{m+1}$) is one more than the memory counter in the present memory location (i.e., $C_m$). If the memory counter values are sequential in the two examined memory locations at step 712, the microcontroller 134 determines if the positions in the same two memory locations are substantially sequential, i.e., within eight (8) Hall effect sensor edges, at step 714. Specifically, a determination is made at step 714 as to whether the position in the next memory location is less than eight (8) Hall effect sensor edges away from the position in the present memory location. If so, the microcontroller 134 increments the variable m at step 716, such that the microcontroller is ready to examine the next memory location. If the microcontroller 134 has not examined all of the memory locations in the position table 190 in the memory 138 at step 718, the process loops around to determine if the memory counter values are sequential and the positions are substantially sequential at steps 712 and 714.

If a discontinuity is noticed in the data of the position table 190 at step 712 or step 714, the microcontroller 134 records the present value of the variable m at step 720 and increments the variable k at step 722. The procedure 700 continues to loop until the microcontroller 134 has examined all memory locations at step 718. If the variable k is greater than one (1) at step 724 (i.e., more than one discontinuity was discovered in the position table 190), the microcontroller 134 marks the shade position as lost at step 726 and the procedure 700 exits. When the shade position is lost, the microcontroller 134 does not allow movement of the shade fabric 112 in response to shade movement commands received via the communication circuit 140 until the open and closed limits are once again set.

If the variable k is not greater than one (1) at step 724, the most recent position of the shade fabric 112 in the position table 190 is in the memory location of the variable m in the memory 138, and thus, the present position of the shade is retrieved from the memory location of the variable m at step 728. If the desired position (i.e., from the present command), is not stored in the memory 138 at step 730, the procedure 700 simply exits. Otherwise, if the desired position is stored in the memory 138 at step 730, a determination is made at step 732 as to whether the motor 130 has stalled, i.e., if the present position of the shade fabric 112 is not more than, for example, four (4) Hall effect sensor edges from an initial position of the shade fabric. The microcontroller 134 stores the initial position of the shade fabric 112 in the memory 138 when the microcontroller first receives a shade movement command and first starts moving, as will be described in greater detail below with reference to FIGS. 8A and 8B.

If the motor has not stalled at step 732, the microcontroller 134 increments the reset counter by one (1) and stores the reset counter in the memory 138 at step 734. If the motor has stalled at step 732, the reset counter is incremented by five (5) and is stored in the memory 138 at step 736. Therefore, the reset counter reaches the maximum reset counter value, i.e., 25 resets, more quickly if the motor 130 has stalled. If the microcontroller 134 detects a stall, the microcontroller retries driving the motor 130 fewer times than if the motor is overloaded. After the reset counter is incremented at step 734 or step 736, the microcontroller 134 issues a shade movement command using the desired position (i.e., from the present command stored in the memory 138) at step 738.

Figure 7B:
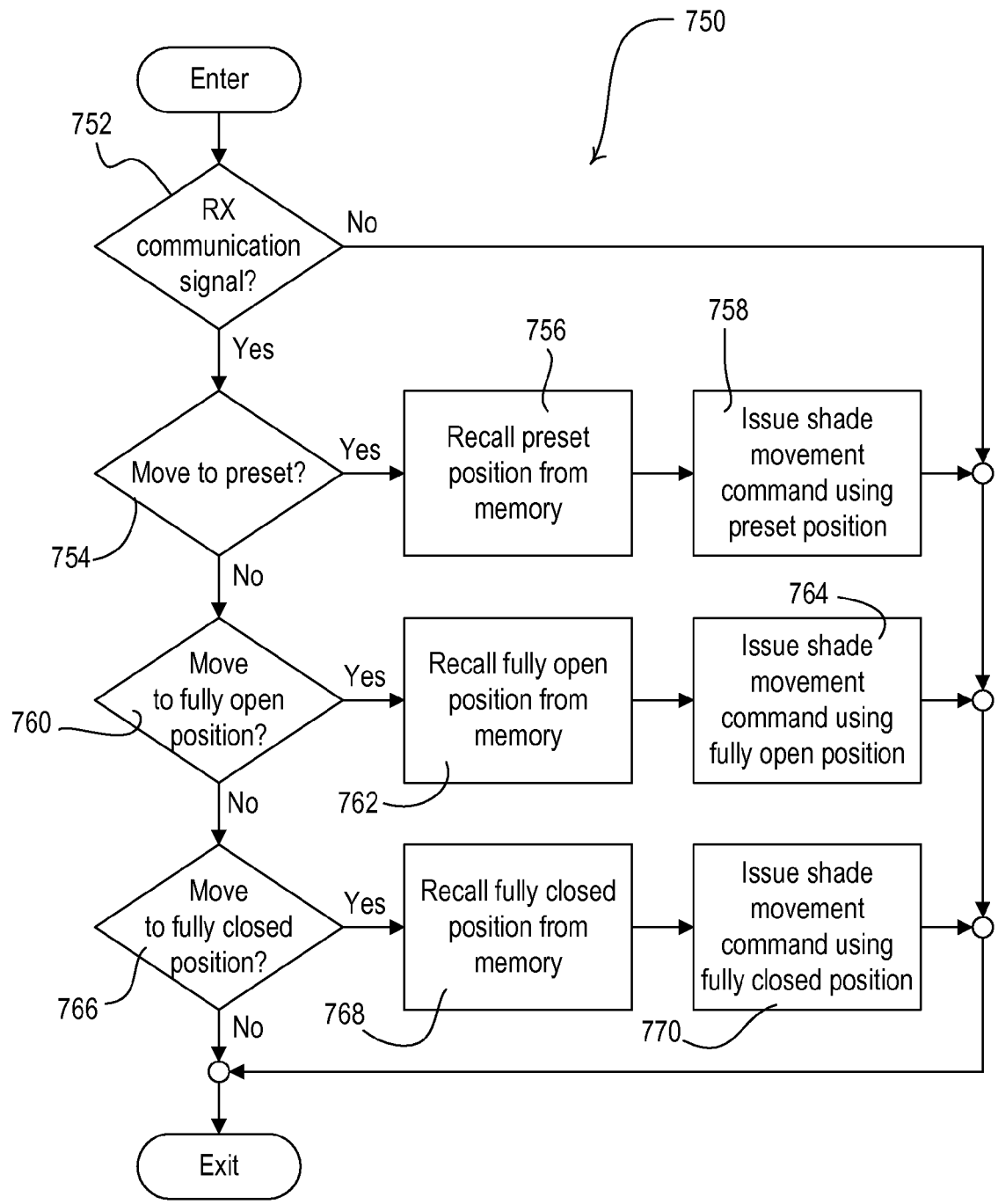
FIG. 7B is a simplified flowchart of a communication signal procedure executed by the microcontroller of the electronic drive unit of FIG. 2.

FIG. 7B is a simplified flowchart of a communication signal procedure 750, which is executed by the microcontroller 134 periodically, e.g., every five (5) msec. If the microcontroller 134 has received a communication signal via the communication circuit 140 at step 752, the microcontroller determines what specific command is included in the communication signal at steps 754, 760, and 766. If the command is a "move to preset" command at step 754, the microcontroller 134 recalls the preset position (i.e., in terms of Hall effect sensor edges) from the memory 138 at step 756. The microcontroller 134 then issues a shade movement command using the preset position at step 758, and the procedure 750 exits. If the command is a "move to fully open position" command at step 760, the microcontroller 134 recalls the fully open position from the memory 138 at step 762, issues a shade movement command using the fully open position at step 764, and exits the procedure 750. Similarly, if the command is a "move to fully closed position" command at step 766, the microcontroller 134 recalls the fully closed position from the memory 138 at step 768 and issues a shade movement command using the fully closed position at step 770, before exiting the procedure 750.

Figure 7C:
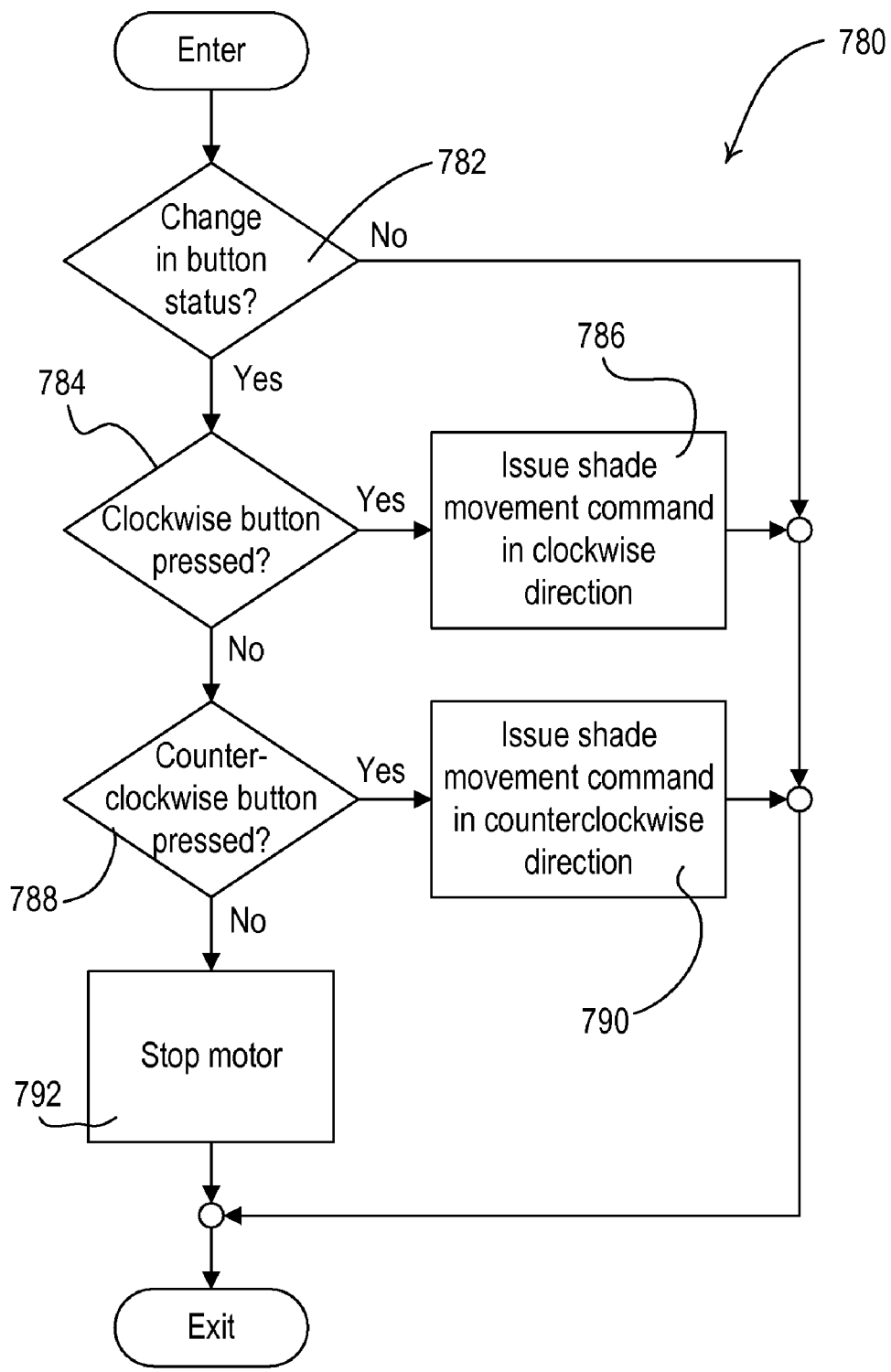
FIG. 7C is a simplified flowchart of a button procedure executed by the microcontroller of the electronic drive unit of FIG. 2.

FIG. 7C is a simplified flowchart of a button procedure 780, which is executed by the microcontroller 134 periodically, e.g., every five (5) msec, to monitor the buttons 144. If there has not been a recent change in the status of the buttons 144 at step 782 (i.e., neither the clockwise button nor the counterclockwise button has just been pressed or released), the button procedure 780 simply exits. However, if there has been a change in button status at step 782 and the clockwise button has just been pressed at step 784, the microcontroller 134 issues a shade movement command to move the motor 130 in the clockwise direction at a constant rotational speed at step 786. If the clockwise button was not just pressed at step 784, but the microcontroller 134 determines that the counterclockwise button was just pressed at step 788, the microcontroller issues a shade movement command at step 790, such that the motor 130 rotates in the counterclockwise direction at a constant rotational speed. If there has been a change in the button status at step 782, but the clockwise and counterclockwise buttons have not just been pressed at steps 784 and 788, the microcontroller 134 determines that either of the buttons has been released and accordingly stops the motor 130 at step 792 before exiting the procedure 780.

Figure 8A:
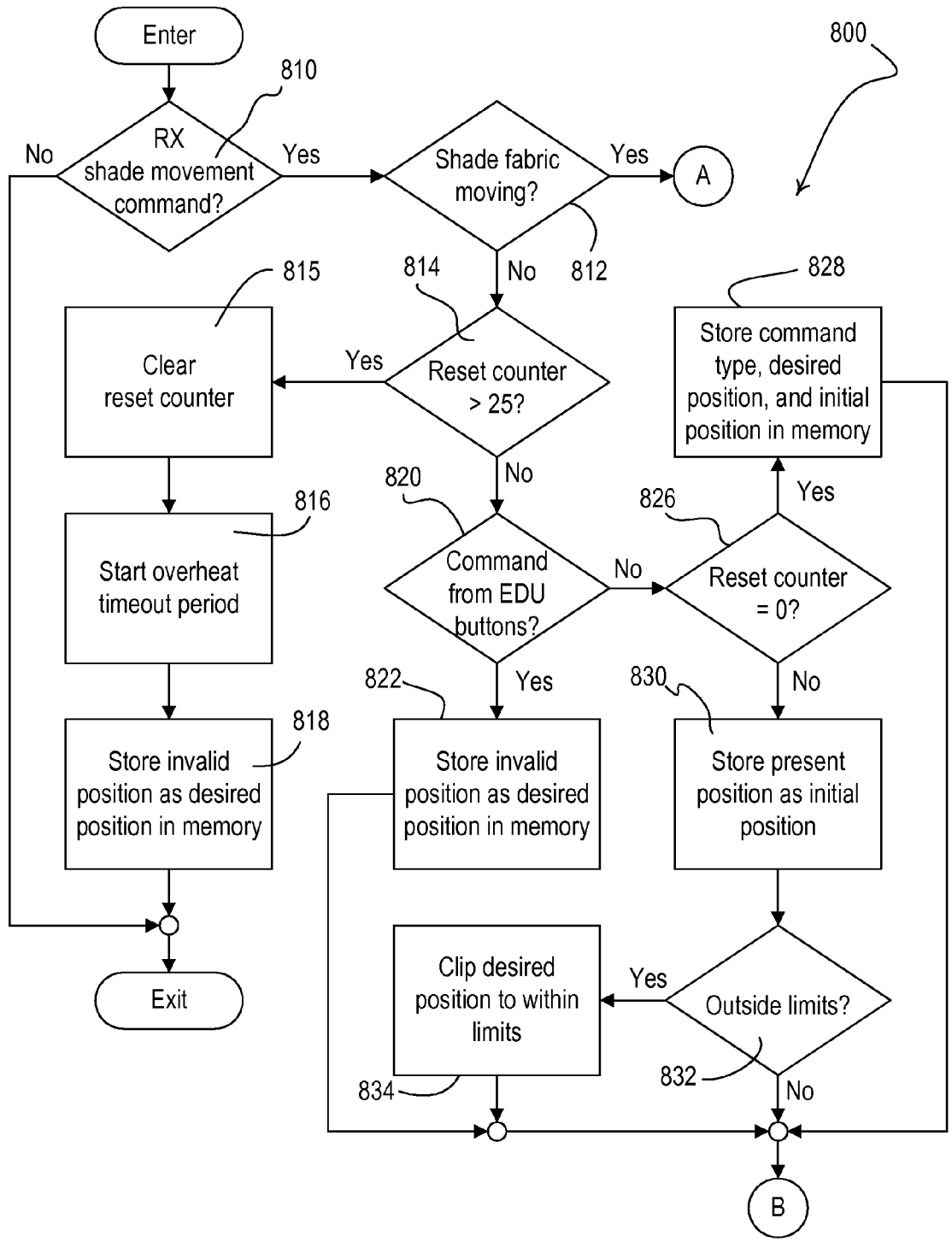
FIGS. 8A and 8B are simplified flowcharts of a shade movement procedure executed by the microcontroller of the electronic drive unit of FIG. 2.
Figure 8B:
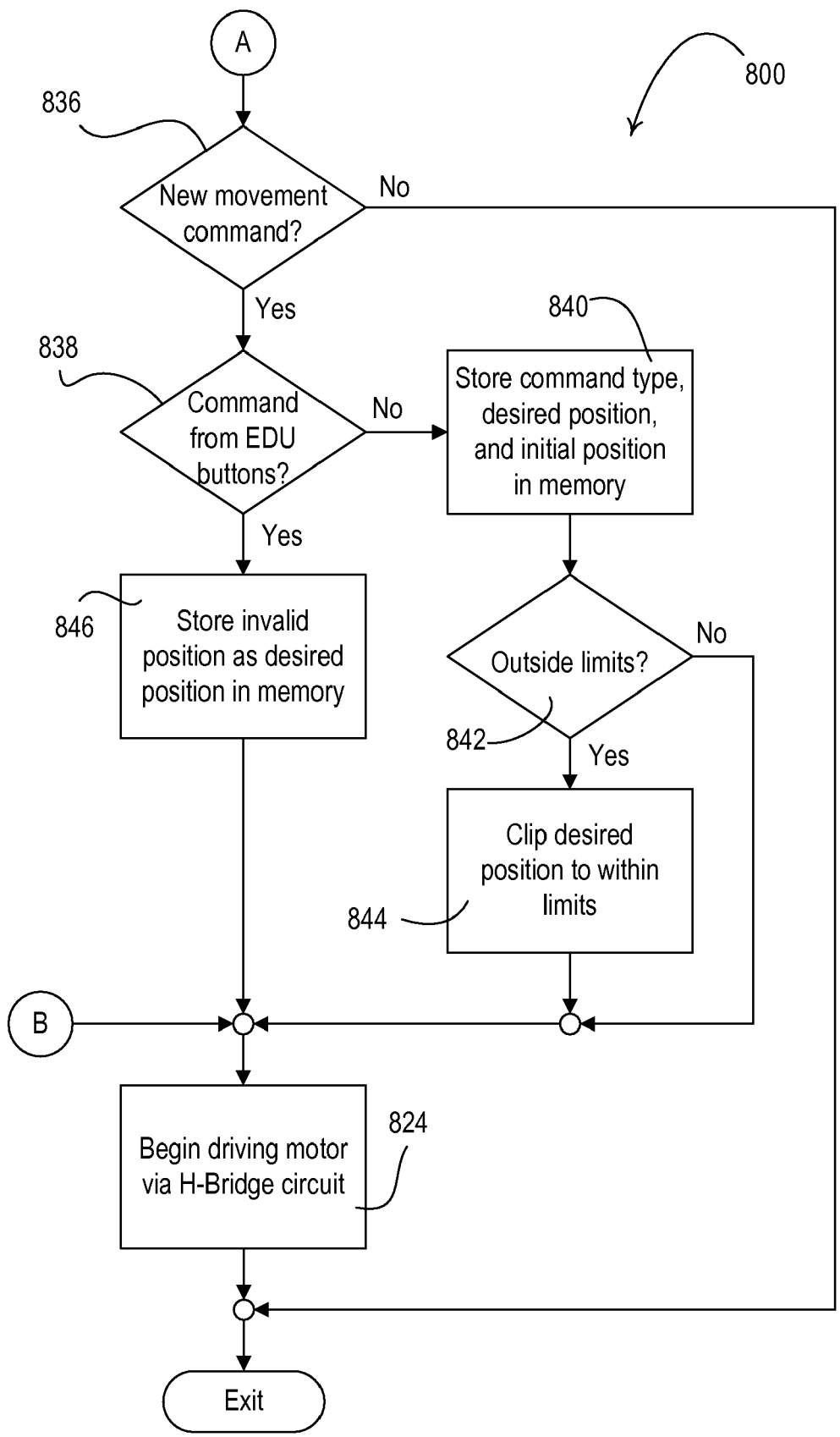

FIGS. 8A and 8B are simplified flowcharts of a shade movement procedure 800, which is executed by the microcontroller 134 periodically, e.g., approximately every ten (10) msec. The shade movement procedure operates on shade movement commands that may be issued in response to a communication signal received via the communication link 122 (i.e., at steps 758, 764, and 770 of FIG. 7B) or from the user inputs provided by the buttons 144 of the electronic drive unit 120 (i.e., at steps 786 and 790 of FIG. 7C). The shade movement commands may also be issued by the microcontroller 134 during the startup procedure 700 (i.e., at step 738 of FIG. 7A). If the microcontroller 134 is repeatedly resetting because of a motor overload condition, the startup procedure 700 issues the shade movement command and the shade movement procedure 800 then operates on the shade movement command.

If the microcontroller 134 has received a shade movement command at step 810, and the shade fabric 112 is not presently moving at step 812, a determination is made at step 814 as to whether the reset counter has exceeded a predetermined threshold, e.g., 25. If the reset counter has exceeded the predetermined threshold at step 814, the microcontroller 134 clears the reset counter at step 815 and starts an overheat timeout period at step 816. During the overheat timeout period, the microcontroller 134 prevents the motor 130 from rotating for a predetermined amount of time, e.g., approximately 20 minutes, after the reset counter has exceeded the predetermined threshold. The microcontroller 134 then stores an invalid position (e.g., 0xFF in hexadecimal) as the desired position in the memory 138 at step 818 and the procedure 800 exits. If the invalid position is stored as the desired position, the microcontroller 134 does not attempt to drive the motor 130 after another reset.

If the reset counter is not greater than 25 at step 814, but the shade movement command originated from the buttons 144 of the electronic drive unit 120 at step 820, the microcontroller 134 stores the invalid position as the desired position in the memory 138 at step 822, i.e., the microcontroller does not attempt to drive the motor after the next reset. The microcontroller 134 then begins driving the motor 130 via the H-bridge motor drive circuit 132 in accordance with the new command at step 824 (as shown in FIG. 8B).

If the shade movement command is not from the buttons 144 of the electronic drive unit 120 at step 820, but the reset counter is equal to zero at step 826, a new shade movement command has been received. Accordingly, the microcontroller 134 stores the new command type, the desired position, and the initial position (i.e., the present position when the command is received) in the memory 138 at step 828. The microcontroller 134 then begins driving the motor 130 via the H-bridge motor drive circuit 132 in accordance with the new command at step 824.

If the reset counter is not equal to zero at step 826, the microcontroller 134 stores the present position as the initial position in the memory at step 830. If the shade movement command would not send the shade fabric 112 outside the open and closed limits at step 832, the motor is driven appropriately at step 824. Otherwise, the desired position is clipped (i.e., adjusted) to be within the open and closed limits at step 834 and the motor is driven accordingly at step 824.

Referring to FIG. 8B, if the shade fabric 112 is presently moving at step 812 and the microcontroller 134 has received a new shade movement command (i.e., having a different desired position) at step 836, a determination is made at step 838 as to whether the shade movement command originated from the buttons 144 of the electronic drive unit 120. If not, the microcontroller stores the new command type, the new desired position, and the initial position in the memory 138 at step 840. If the new command would cause the shade fabric 112 to move outside the open and closed limits at step 842, the microcontroller 134 adjusts the desired position to be within the open and closed limits at step 844. If the shade movement command is from the buttons 144 at step 838, the microcontroller 134 stores the invalid position as the desired position at step 846. Finally, the microcontroller 134 appropriately drives the motor 130 at step 824.

Figure 9:
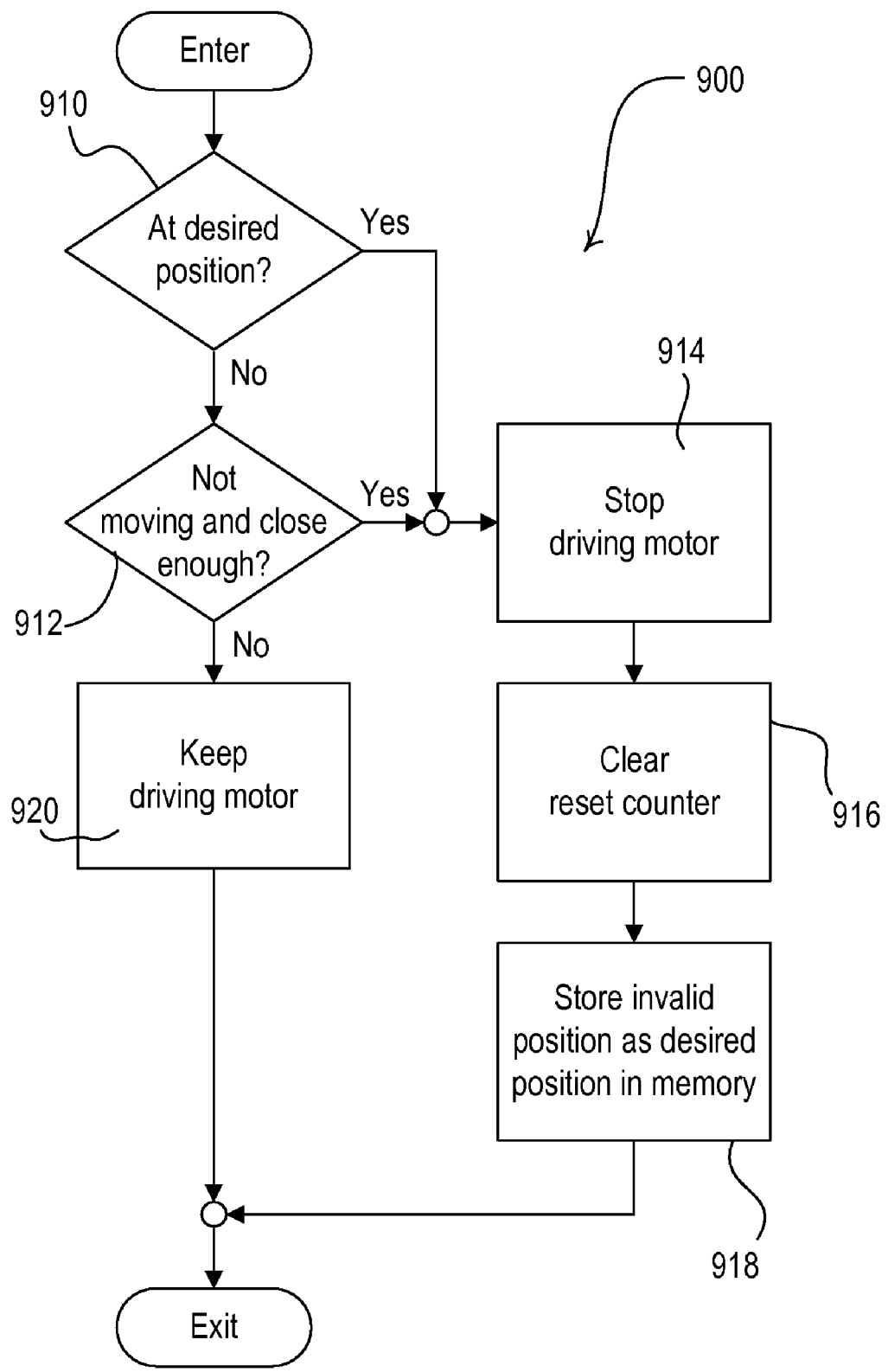
FIG. 9 is a simplified flowchart of a motor procedure executed by the microcontroller of the electronic drive unit of FIG. 2.

FIG. 9 is a simplified flowchart of a motor procedure executed periodically by the microcontroller 134, for example, approximately every 6 msec. If the shade fabric 112 is at the desired position at step 910 or if the shade fabric is not moving, but is close enough to the desired position (e.g., within eight Hall effect sensor edges) at step 912, the microcontroller 134 stops driving the motor 130 at step 914. The microcontroller 134 then clears the reset counter at step 916 and stores the invalid position as the desired position in the memory 138 at step 918, before the procedure 900 exits. If the shade fabric is not at the desired position at step 910 and is not close enough to the desired position at step 912, the microcontroller 134 continues to drive the motor 130 at step 920 and exits the procedure 900.

While the microcontroller 134 of the first embodiment of the present invention controlled the motor 130 to off, the microcontroller could alternatively scale back driving the motor rather than simply stopping the motor if the bus voltage $V_{BUS}$ drops below the first voltage threshold $V_{TH1}$. For example, the microcontroller 134 could control the motor 130 such that the magnitude of the bus voltage $V_{BUS}$ is maintained at a desired overload magnitude (that is less than the nominal magnitude, i.e., 30 $V_{DC}$) during overload conditions.

Figure 10:
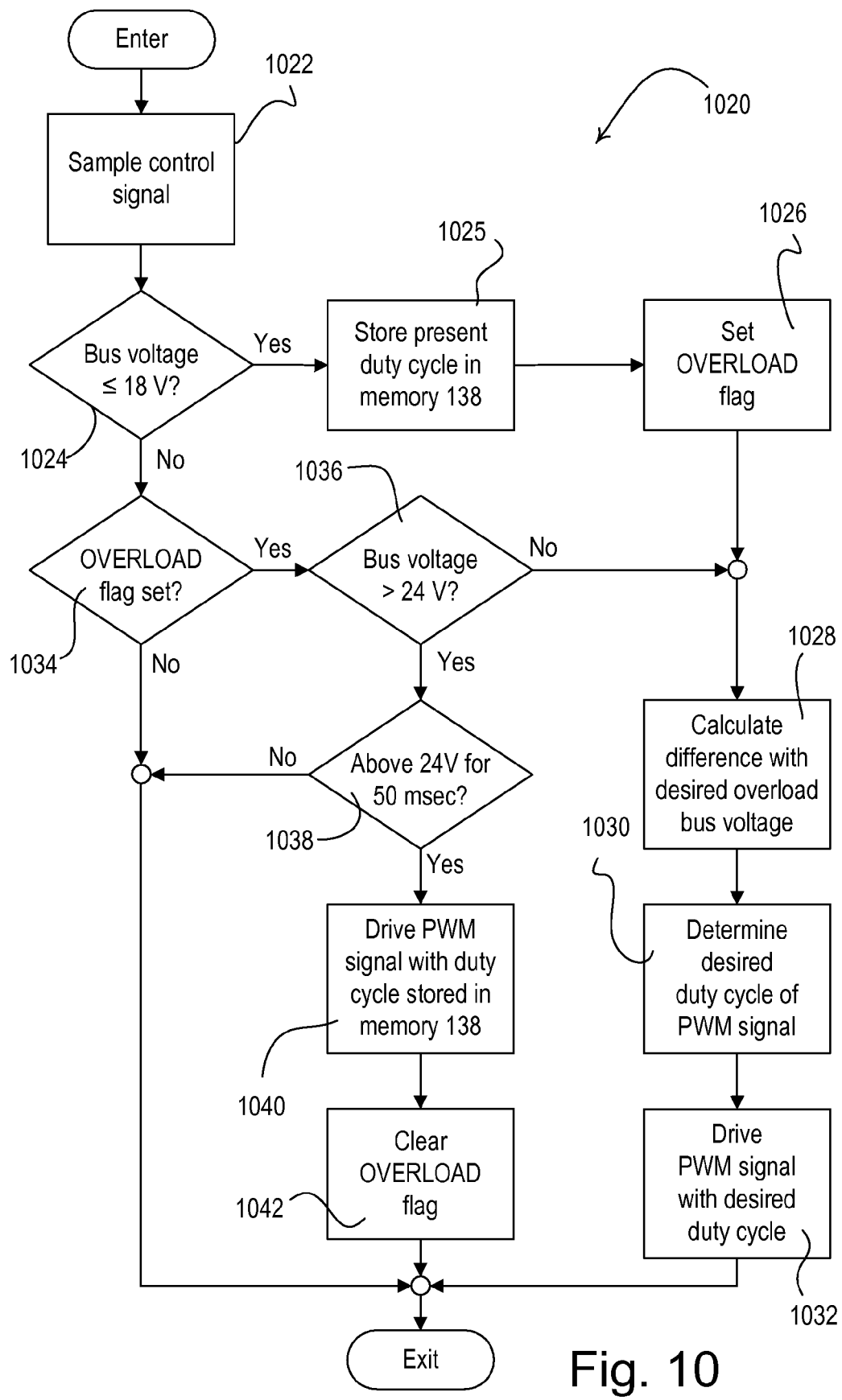
FIG. 10 is a simplified flowchart of a bus voltage monitor procedure executed by the microcontroller of the electronic drive unit of FIG. 2 according to a second embodiment of the present invention.

FIG. 10 is a simplified flowchart of a bus voltage monitor procedure 1020 executed periodically (e.g., every 572 μsec) by the microcontroller 134 according to a second embodiment of the present invention. At step 1022, the microcontroller 134 samples the control signal BUS_MNTR. If the bus voltage $V_{BUS}$ is less than or equal to the first voltage threshold $V_{TH1}$ at step 1024, the controller 134 stores the present duty cycle of the PWM signal driving the H-bridge motor drive circuit 132 at step 1025 and sets the OVERLOAD flag at step 1026. Next, the controller 134 begins to decrease the duty cycle of the PWM signal driving the H-bridge motor drive circuit 132. Specifically, microcontroller 134 calculates the difference $V_{DIFF}$ between the actual magnitude of the bus voltage $V_{BUS}$ and a desired overload magnitude (e.g., approximately 20 V) at step 1028, and determines the desired duty cycle DC of the PWM signal in response to the difference $V_{DIFF}$ at step 1030, e.g., by using the equation $$DC = \alpha \cdot V_{DIFF} + DC_{TYP} \qquad \text{(Equation 1)}$$

where $DC_{TYP}$ is the typical duty cycle value of the PWM signal that should cause the magnitude of the bus voltage $V_{BUS}$ to be close to the desired overload magnitude. Next, the microcontroller 134 generates the PWM signal at step 1032 with the duty cycle DC determined at step 1030, and the procedure 1020 exits.

When the bus voltage monitor procedure 1020 is executed again and the magnitude of the bus voltage $V_{BUS}$ is greater than the first voltage threshold $V_{TH1}$ at step 1024, a determination is made at step 1034 as to whether the OVERLOAD flag is set. If the OVERLOAD flag is set at step 1034, but the magnitude of the bus voltage $V_{BUS}$ is not greater than the second voltage threshold $V_{TH2}$ at step 1036, the microcontroller 134 determines the appropriate duty cycle and drives the PWM signal once again at steps 1028, 1030, 1032. When the magnitude of the bus voltage $V_{BUS}$ is greater than the second voltage threshold $V_{TH2}$ at step 1036, but has not been greater than the second voltage threshold $V_{TH2}$ for a predetermined amount of time (e.g., 50 msec) at step 1038, the procedure 1020 simply exits. However, when the magnitude of the bus voltage $V_{BUS}$ has been greater than the second voltage threshold $V_{TH2}$ for the predetermined amount of time at step 1038, the microcontroller 134 drives the PWM signal with the duty cycle stored in the memory 138 at step 1040, and clears the OVERLOAD flag at step 1042, before the procedure 1020 exits.

Figure 11:
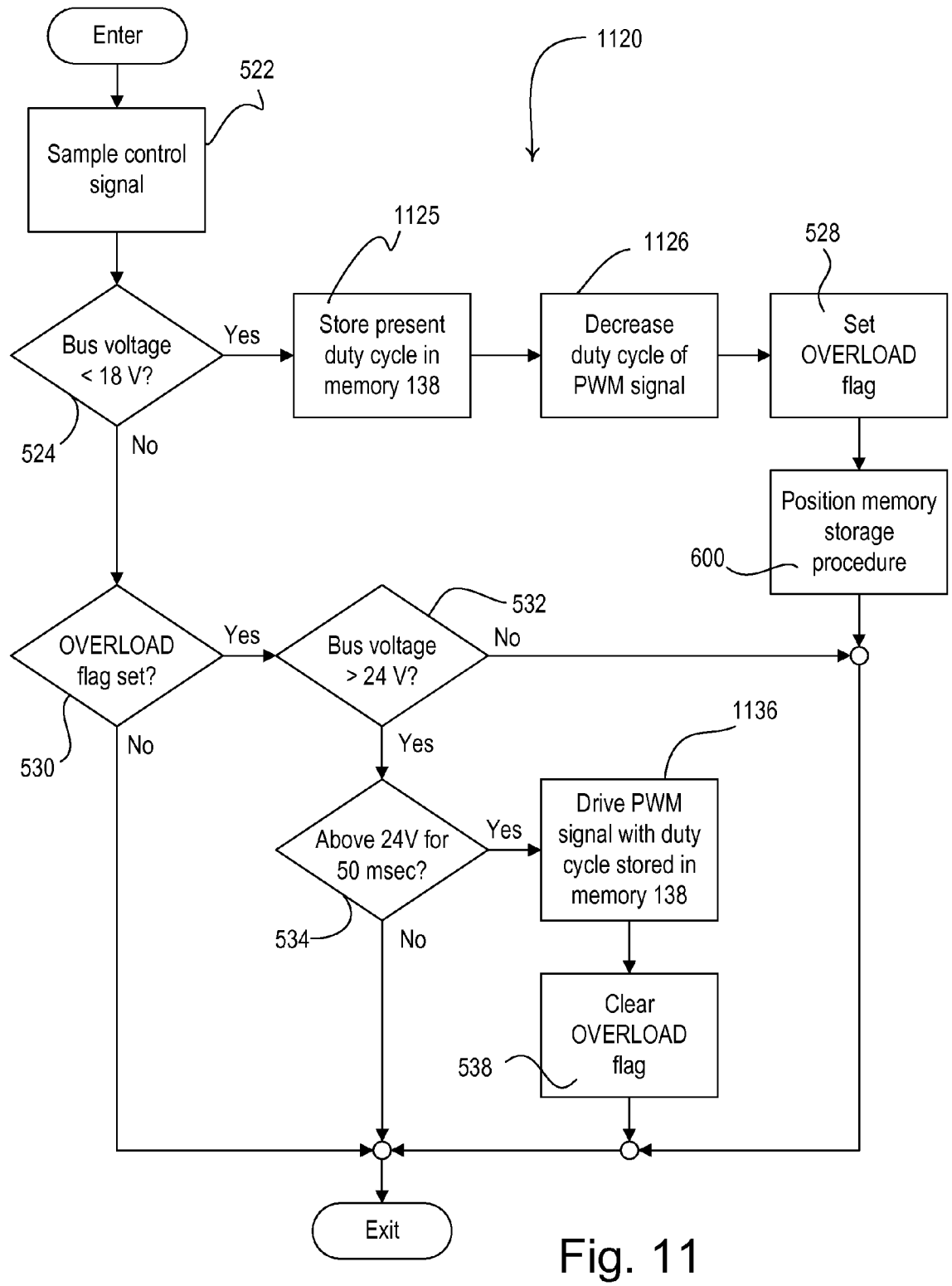
FIG. 11 is a simplified flowchart of a bus voltage monitor procedure executed by the microcontroller of the electronic drive unit of FIG. 2 according to a third embodiment of the present invention.

FIG. 11 is a simplified flowchart of a bus voltage monitor procedure 1120 executed periodically (e.g., every 572 μsec) by the microcontroller 134 according to a third embodiment of the present invention. The bus voltage monitor procedure 1120 is identical to the bus voltage monitor procedure 520 of FIG. 5B, except that the microcontroller 134 now decreases the amount of current delivered to the motor by storing the present duty cycle of the PWM signal in the memory 138 at step 1125 and then decreasing the duty cycle of the PWM signal to a predetermined duty cycle (e.g., 50%) at step 1126 rather than simply stopping the motor (i.e., at step 526 of FIG. 5B). Further, the microcontroller 134 increases the duty cycle of the PWM signal stored in the memory 138 at step 1136.

Figure 12A:
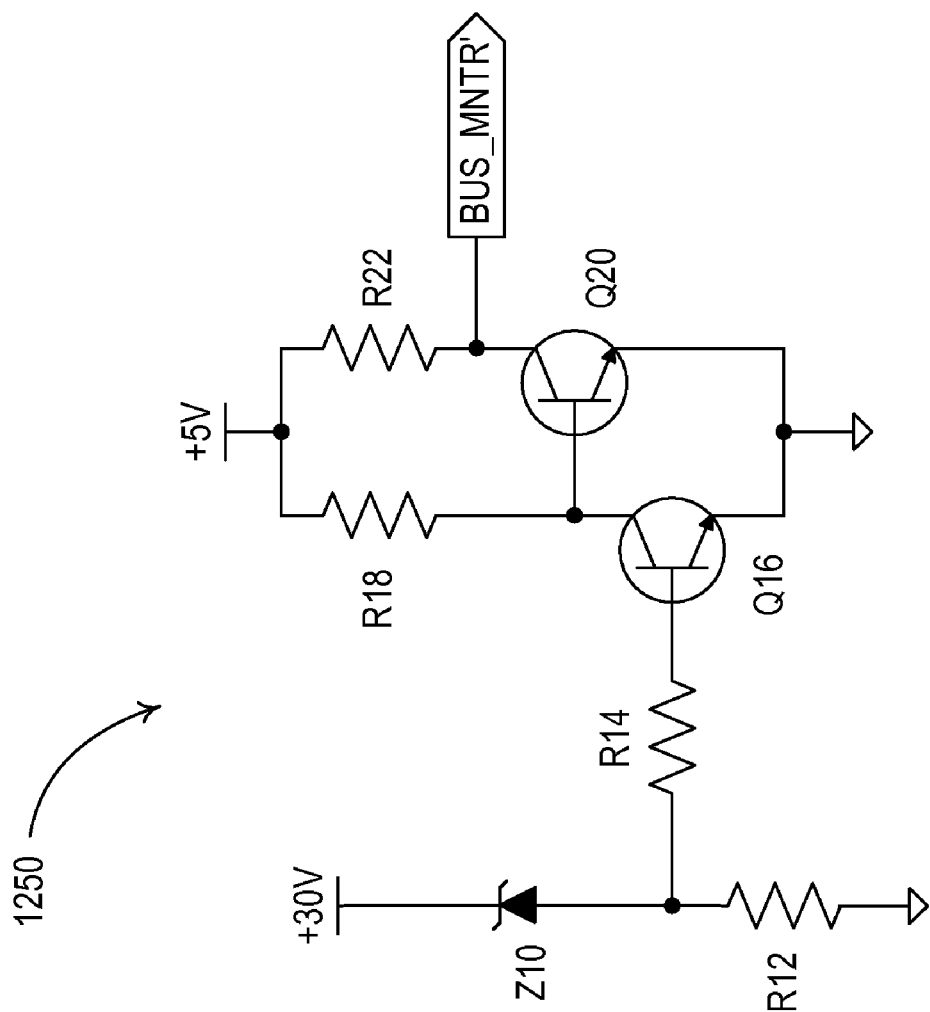
FIG. 12A is a simplified schematic diagram of a bus voltage monitor circuit according to a fourth embodiment of the present invention.

FIG. 12A is a simplified schematic diagram of a bus voltage monitor circuit 1250 according to a fourth embodiment of the present invention. The bus voltage monitor circuit 1250 provides a discrete-logic control signal BUS_MNTR' to the microcontroller 134. The control signal control signal BUS_MNTR' is high (i.e., approximately equal to the supply voltage $V_{CC}$) when the magnitude of the bus voltage $V_{BUS}$ is at an appropriate level. When the magnitude of the bus voltage $V_{BUS}$ falls below a third voltage threshold $V_{TH3}$, the control signal BUS_MNTR' is controlled low (i.e., to circuit common or approximately zero volts). Accordingly, the microcontroller 134 does not require an analog-to-digital converter to receive the control signal BUS_MNTR'.

The bus voltage monitor circuit 1250 comprises a zener diode Z10 coupled in series with a resistor R12 (e.g., having a resistance of 10 kΩ) between the bus voltage $V_{BUS}$ and circuit common. For example, the zener diode Z10 has a break-over voltage of approximately 14 V, such that when the magnitude of the bus voltage $V_{BUS}$ is above the third voltage threshold $V_{TH3}$ (e.g., approximately 15 V), the zener diode Z10 conducts a current through a resistor R14 (e.g., having a resistance of 10 kΩ) and into the base of a first NPN transistor Q16. The first transistor Q16 is rendered conductive, thus pulling the base of a NPN second transistor Q20 to circuit common. Accordingly, the second transistor is rendered non-conductive. The collector of the second transistor Q20 provides the control signal BUS_MNTR' to the microcontroller 134. When the second transistor Q20 is non-conductive, the control signal BUS_MNTR' is pulled high to the supply voltage $V_{CC}$ through a resistor R22 (e.g., having a resistance of 2.2 kΩ). For example, both transistors Q16, Q20 are part number MPSA06 manufactured by On Semiconductor.

When the voltage the magnitude of the bus voltage $V_{BUS}$ drops below the third voltage threshold $V_{TH3}$ (i.e., 15 V), the first transistor Q16 is rendered non-conductive and the collector is pulled high to the supply voltage $V_{CC}$ through a resistor R18 (e.g., having a resistance of 10 kΩ). The resistor R18 conducts a current through the base of the second transistor Q20, thus rendering the second transistor conductive. The control signal BUS_MNTR' is pulled down to circuit common (i.e., low) when the bus voltage $V_{BUS}$ is below the third voltage threshold $V_{TH3}$. When the voltage the magnitude of the bus voltage $V_{BUS}$ rises back above the third voltage threshold $V_{TH3}$, the control signal BUS_MNTR' is once again pulled up to the supply voltage $V_{CC}$ (i.e., high).

Figure 12B:
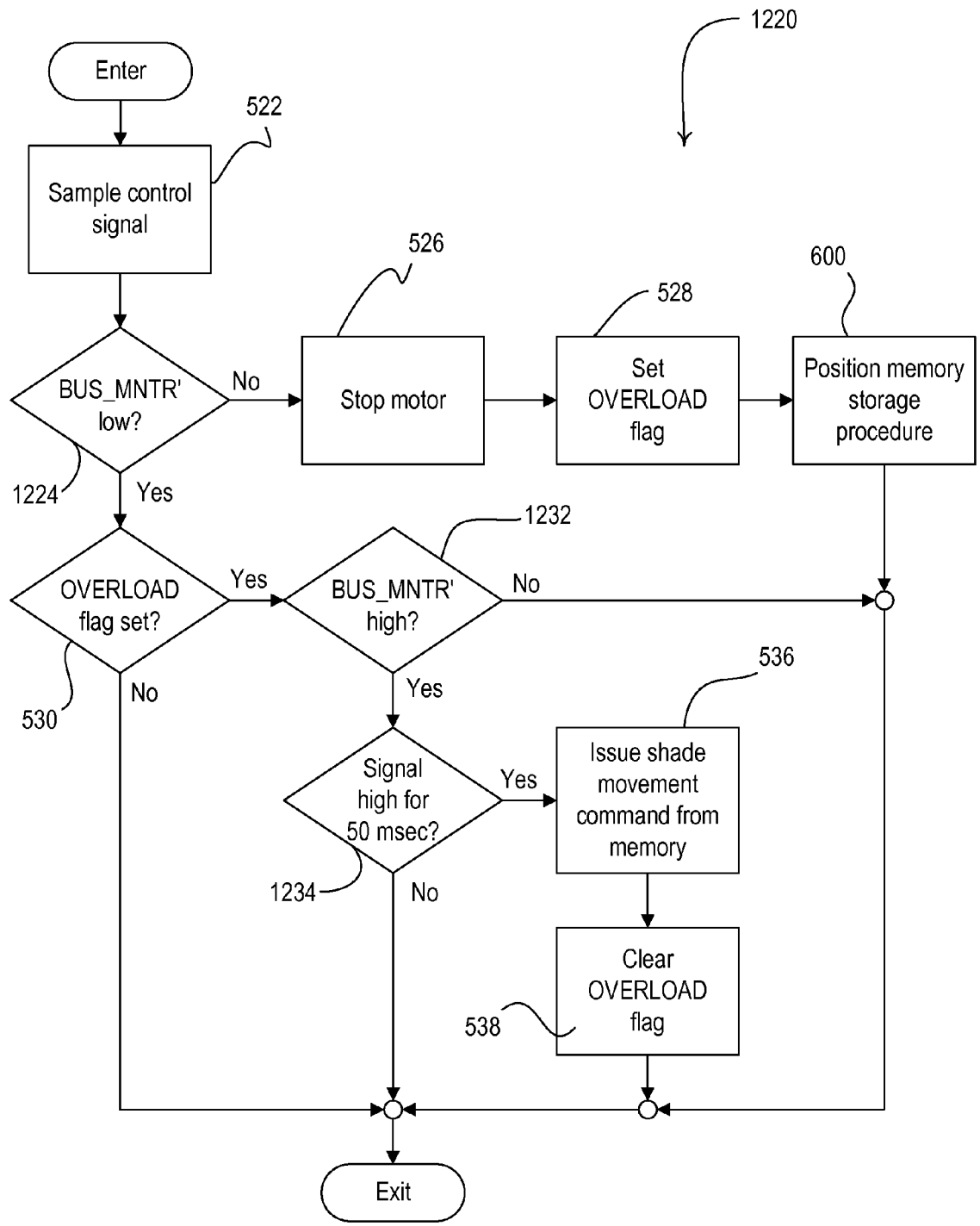
FIG. 12B is a simplified flowchart of a bus voltage monitor procedure executed by the microcontroller of the electronic drive unit of FIG. 2 according to the fourth embodiment of the present invention.

FIG. 12B is a simplified flowchart of a bus voltage monitor procedure 1220 according to the fourth embodiment of the present invention. The microcontroller 134 executes the bus voltage monitor procedure 1220 periodically (e.g., every 572 μsec) when receiving the control signal BUS_MNTR' from the bus voltage monitor circuit 1250. The bus voltage monitor procedure 1220 is identical to the bus voltage monitor procedure 520 of FIG. 5B, except that the microcontroller 134 determines if the control signal BUS_MNTR' is low or high at steps 1224 and 1232, respectively. Also, at step 1234, the microcontroller 134 determines if the control signal BUS_MNTR' has been high for at least 50 msec.

The present invention describes a closed loop algorithm for controlling a motorized roller shade through a motor overload condition or a low-line condition. An open loop algorithm for controlling a motorized roller shade through a motor overload condition or a low-line condition is described in greater detail in co-pending, commonly-assigned U.S. patent application Ser. No. 11/787,723, filed Apr. 17, 2007, entitled METHOD OF CONTROLLING A MOTORIZED WINDOW TREATMENT, the entire disclosure of which is hereby incorporated by reference.

While the present invention has been described with reference to motorized roller shades, the method of the present invention could be applied to any type of motorized window treatment that includes a motor drive, such as, for example, motorized draperies and motorized Roman shades.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of controlling a motorized window treatment in response to a command, the motorized window treatment comprises a motor selectively driven by a bus voltage, the method comprising the steps of:
   driving the motor in response to the command;
   monitoring the magnitude of the bus voltage;
   comparing the magnitude of the bus voltage to a first voltage threshold;
   decreasing the amount of current supplied to the motor if the magnitude of the bus voltage has dropped below the first voltage threshold;
   comparing the magnitude of the bus voltage to a second voltage threshold after the step of decreasing the amount of current supplied to the motor; and
   increasing the amount of current supplied to the motor if the magnitude of the bus voltage has risen above the second voltage threshold.

2. The method of claim 1, wherein the step of decreasing the amount of current comprises stopping driving the motor if the magnitude of the bus voltage has dropped below the first voltage threshold, and the step of increasing the amount of current comprises driving the motor once again if the magnitude of the bus voltage has risen above the second voltage threshold.

3. The method of claim 2, further comprising the step of:
   storing the command and a present position of the motorized window treatment in a memory if the magnitude of the bus voltage has dropped below the first voltage threshold.

4. The method of claim 3, further comprising the step of:
   adjusting the present position of the motorized window treatment in response to the rotational position of the motor;
   wherein the step of storing a present position further comprises storing a present position of the motorized window treatment in the memory each time the rotational position of the motor changes by the predetermined angle, such that a plurality of positions are stored in the memory.

5. The method of claim 4, further comprising the steps of:
   incrementing a memory counter each time one of the plurality of positions is stored in the memory; and
   storing the present value of the memory counter in the memory each time one of the plurality of position is stored in the memory, such that a plurality of memory counter values are stored in the memory.

6. The method of claim 3, further comprising the steps of:
   recalling the command and the present position from the memory after the magnitude of the bus voltage has risen above the second voltage threshold; and
   subsequently driving the motor in response to the command and the present position recalled from the memory.

7. The method of claim 1, wherein the step of driving the motor further comprises generating a pulse-width modulated signal characterized by a duty cycle, and driving the motor with the pulse-width modulated signal in response to the command.

8. The method of claim 7, wherein the step of decreasing the amount of current comprises decreasing the duty cycle of the pulse-width modulated signal driving the motor if the magnitude of the bus voltage has dropped below the first voltage threshold, and the step of increasing the amount of current comprises driving increasing the duty cycle of the pulse-width modulated signal if the magnitude of the bus voltage has risen above the second voltage threshold.

9. The method of claim 8, further comprising the step of:
storing the duty cycle of the pulse-width modulated signal in a memory before the step of decreasing the duty cycle of the pulse-width modulated signal;
wherein the step of increasing the duty cycle comprises increasing the duty cycle to the duty cycle stored in the memory.

10. The method of claim 9, further comprising the step of:
controlling the duty cycle in response to the magnitude of the bus voltage if the magnitude of the bus voltage has dropped below the first voltage threshold.

11. The method of claim 9, wherein the step of decreasing the duty cycle comprises decreasing the duty cycle to a predetermined duty cycle less than the duty cycle stored in the memory.

12. The method of claim 1, wherein the step of increasing the amount of current comprises increasing the amount of current supplied to the motor in response to the command if the magnitude of the bus voltage has risen above the second voltage threshold if the magnitude of the magnitude of the bus voltage has been greater than the second voltage threshold for more than a predetermined amount of time.

13. The method of claim 12, wherein the predetermined amount of time is approximately 50 msec.

14. The method of claim 1, wherein the second voltage threshold is greater than the first voltage threshold.

15. A method of controlling a motorized window treatment in response to a command, the motorized window treatment comprises a motor selectively driven by a bus voltage, the method comprising the steps of:
generating a pulse-width modulated signal from the bus voltage, the pulse-width modulated signal characterized by a duty cycle;
driving the motor with the pulse-width modulated signal in response to the command;
monitoring the magnitude of the bus voltage;
comparing the magnitude of the bus voltage to a first voltage threshold; and
decreasing the duty cycle of the pulse-width modulated signal driving the motor if the magnitude of the bus voltage has dropped below the first voltage threshold; comparing the magnitude of the bus voltage to a second voltage threshold after the step of reducing the duty cycle of the pulse-width modulated signal; and increasing the duty cycle of the pulse-width modulated signal driving the motor if the magnitude of the bus voltage has risen above the second voltage threshold.

16. An electronic drive unit for controlling the position of a motorized window treatment comprising:
a motor coupled to the motorized window treatment for adjusting the position the motorized window treatment;
a motor drive circuit coupled to the motor for driving the motor from a bus voltage;
a controller coupled to the motor drive circuit operable to drive the motor drive circuit so as to control the rotation of the motor to control the motorized window treatment in response to a command; and
a bus voltage monitor circuit coupled to the controller for providing a control signal representative of a magnitude of the bus voltage to the controller;
wherein the controller is operable to compare the magnitude of the bus voltage to a first voltage threshold, to control the motor drive circuit to decrease the amount of current supplied to the motor if the bus voltage has dropped below the first voltage threshold, to subsequently compare the magnitude of the bus voltage to a second voltage threshold, and to control the motor drive circuit to increase the amount of current supplied to the motor if the bus voltage has risen above the second voltage threshold.

17. The electronic drive unit of claim 16, wherein the controller is operable to stop driving the motor if the magnitude of the bus voltage has dropped below the first voltage threshold, and to once again begin driving the motor if the bus voltage has risen above the second voltage threshold.

18. The electronic drive unit of claim 17, further comprising:
a rotational position sensor coupled to the motor, the controller operable to determine a rotational position of the motor in response to the rotational position sensor; and
a memory coupled to the controller, such that the controller is operable to store the command in the memory, the controller further operable to store a present position of the motorized window treatment in the memory in response to determining that the rotational position of the motor has changed by a predetermined angle;
wherein the controller is operable to recall the command and the present position from the memory after the controller is reset, and to drive the motor drive circuit in response to the command and the present position recalled from the memory.

19. The electronic drive unit of claim 16, wherein the controller is operable to generate a pulse-width modulated signal characterized by a duty cycle for driving the motor.

20. The electronic drive unit of claim 19, wherein the controller is operable to decrease the duty cycle of the pulse-width modulated signal if the magnitude of the bus voltage has dropped below the first voltage threshold, and to increase the duty cycle of the pulse-width modulated signal if the magnitude of the bus voltage has risen above the second voltage threshold.

21. The electronic drive unit of claim 16, further comprising:
a bus capacitor coupled to the drive circuit, the bus voltage produced across the bus capacitor; and
a rectifier for receiving a source voltage and for generating the bus voltage across the bus capacitor.

22. A system for delivering a transitory duration of high power from a power source to an electrical load without collapsing a supply voltage, the system comprising:
a first power supply for generating a bus voltage from a source voltage of the power source;
a second power supply for generating the supply voltage from the bus voltage;
a drive circuit receiving the bus voltage and adapted to control the amount of current delivered to the electrical load; and
a controller powered by the supply voltage and coupled to the drive circuit for controlling the amount of current delivered to the electrical load and responsive to the magnitude of the bus voltage, the controller operable to compare the magnitude of the bus voltage to a first voltage threshold, to control the drive circuit to decrease the amount of current supplied to the electrical load if the bus voltage has dropped below the first voltage threshold, to subsequently compare the magnitude of the bus voltage to a second voltage threshold, and to control the drive circuit to increase the amount of current supplied to the electrical load if the bus voltage has risen above the second voltage threshold.

23. The system of claim 22, wherein the first power supply comprises a bus capacitor and a rectifier for receiving a source voltage and for generating the bus voltage across the bus capacitor.

* * * * *